ns*

United States Patent [19]
Sakoda et al.

[11] Patent Number: 5,907,583
[45] Date of Patent: May 25, 1999

[54] RECEIVING APPARATUS, TRANSMITTING/ RECEIVING APPARATUS, AND COMMUNICATING METHOD

[75] Inventors: Kazuyuki Sakoda, Tokyo; Mitsuhiro Suzuki, Chiba, both of Japan

[73] Assignee: Sony Corporation, Tokyo, Japan

[21] Appl. No.: 09/103,835

[22] Filed: Jun. 24, 1998

[30] Foreign Application Priority Data

Jun. 24, 1997 [JP] Japan .................................. 9-167756

[51] Int. Cl.$^6$ .................................................. H04L 27/28
[52] U.S. Cl. .................. 375/260; 375/262; 375/298; 375/341
[58] Field of Search .................................. 375/260, 262, 375/295, 261, 298, 316, 341; 370/522, 525, 526, 527, 528, 480, 343; 455/59

[56] References Cited

U.S. PATENT DOCUMENTS

| | | | |
|---|---|---|---|
| 4,881,245 | 11/1989 | Walker et al. | 375/260 |
| 5,170,413 | 12/1992 | Hess et al. | 455/59 |
| 5,278,826 | 1/1994 | Murhy et al. | 370/343 |
| 5,412,686 | 5/1995 | Ling | 375/200 |
| 5,519,730 | 5/1996 | Jasper et al. | 375/261 |
| 5,588,022 | 12/1996 | Dapper et al. | 375/261 |
| 5,748,677 | 5/1998 | Kumar | 375/260 |

*Primary Examiner*—Tesfaldet Bocure
*Attorney, Agent, or Firm*—Jay H. Maioli

[57] ABSTRACT

A receiving apparatus that is capable of applying maximum likelihood sequence estimation precisely, with a simple configuration, wherein characteristics of the transmission line of each symbol group are estimated on the basis of the amplitude and the phases of the pilot symbols which have been extracted from the reception symbol group, and the information symbol group is restored from the reception symbol group on the basis of the result of the estimation, and the coded bit group which has been restored from the information symbol group is multiplied by the weighting factor and caused to reflect the reliability of the transmission line of each symbol group, and maximum likelihood sequence estimation is applied to the coded bit group which is reflecting the reliability, and thereby the information bit sequence is restored. As a result, by the use of simple configuration, influences given at the transmission line can be eliminated and so the information symbol group can be restored exactly. In addition, the reliability of the transmission line of each symbol group can be reflected on the coded bit group, and in this way, maximum likelihood sequence estimation can be applied more precisely.

17 Claims, 17 Drawing Sheets

RECEIVING APPARATUS, TRANSMITTING/ RECEIVING APPARATUS, AND COMMUNICATING METHOD

BACKGROUND OF THE INVENTION

1. Field of the Invention

This invention relates to a receiving apparatus, a transmitting/receiving apparatus, and communicating method, and is suitably applied to a radio communication system such as a portable telephone system.

2. Description of the Related Art

In this type of radio communication systems, an area for providing communication service is divided into cells of the desired size, and base stations are placed in each of cells as fixed radio stations, so that a portable telephone, which is a movable radio station, may perform radio communication with the base station of the cell where the telephone exists. In this way, a so-called cellular system is constructed. In various systems as communication systems between portable telephones and base stations, time division multiple access system is introduced as typical one.

As shown in FIG. 1A and 1B, for example, in TDMA system, a stated frequency channel is temporally partitioned into frames F0, F1, . . . of the stated time width, each of the frames is partitioned into time slots TS0–TS3 of the stated time width, and the transmission signal is transmitted with employing the frequency channel at the timing of the time slot TS0 which has been allocated to the station itself, so that plural communication (so-called multiplex communication) is realized with the single frequency channel, and the frequency is utilized efficiently. In the following description, the time slot TS0 which has been allocated to transmission is referred to as the transmission slot TX, and a data block (that is an information unit) which is transferred in one transmission slot TX is referred to as a slot.

Referring to FIG. 2 and FIG. 3, a transmitting apparatus and a receiving apparatus of a radio communication system for performing transmission/reception employing this TDMA system is explained. The transmitting apparatus and the receiving apparatus shown in FIG. 2 and FIG. 3 are respectively mounted on, for instance, a portable telephone and a base station of a movable telephone system, and used for a communication from a portable telephone toward a base station (so-called upward communication) and a communication from a base station toward a portable telephone (so-called downward communication).

As shown in FIG. 2, a transmitting apparatus 1 is roughly composed of a convolutional coding circuit 2, an interleave buffer 3, a slotting process circuit 4, a modulating circuit 5, a pilot symbol adding circuit 6, a transmitting circuit 7, and an antenna 8, and adapted to input an information bit sequence S1, which is a transmission data, to the convolutional coding circuit 2 at first.

The convolutional coding circuit 2, which comprises a shift register of the stated number of stages and an exclusive-or circuit, performs convolutional coding with the inputted information bit sequence S1, and outputs a coded bit sequence S2 to the interleave buffer 3. The interleave buffer 3 stores the coded bit sequence S2 in the internal storage region, in a regular order; when the coded bit sequence S2 has been stored in the entire storage region (that is, when the desired quantity of the coded bit sequence S2 has been accumulated), it rearranges the order of the coded bit sequence S2 at random (hereinafter, this rearranging of the order is referred to as interleaving), and then outputs a processed coded bit sequence S3 to the slotting process circuit 4. Besides, the interleave buffer 3 has the storage capacity which corresponds to the plural slots, so that the coded bit sequence should be distributed to the plural transmission slots TX.

The slotting process circuit 4 partitions the coded bit sequence S3 for each stated number of bits, in order to allocate the coded bit sequence S3 to the transmission slots TX, and then sequentially outputs a coded bit group S4 to the modulating circuit 5. The modulating circuit 5 applies the stated modulation processing (for instance, modulation processing of synchronous detection system such as QPSK modulation) to the supplied coded bit group S4 respectively, and then outputs the resulted information symbol group S5 to the pilot symbol adding circuit 6.

As shown in FIG. 4, the pilot symbol adding circuit 6 adds the pilot symbols P, as the headers, to the forefront position of each symbol group (that is, the front of the information symbols I) of the information symbol group S5 which have been partitioned in accordance with the transmission slots TX, and then outputs a processed transmission symbol group S6 to the transmitting circuit 7. Furthermore, the pilot symbol P, which is added at this point, is a symbol of the pattern which has been already known to the receiving apparatus side, and the receiving apparatus side is adapted to estimate the characteristics (for instance, the situation of fading, etc.) of the transmission line, by using this pilot symbol P.

The transmitting circuit 7 performs filtering process sequentially with the transmission symbol group S6 to which this pilot symbol has been added, and then, performs digital-to-analog conversion processing with the transmission symbol group S6 to produce a transmission signal. Then, the transmitting circuit 7 performs frequency conversion with the transmission signal to produce a transmission signal S7 of the stated frequency channel, amplifies the transmission signal S7 into the stated electric power, and transmits it via the antenna 8. In this way, the transmission signal S7 is transmitted from the transmitting apparatus 1, in synchronism with the timing of the transmission slot TX.

On the other hand, as shown in FIG. 3, a receiving apparatus 10 is roughly composed of an antenna 11, a receiving circuit 12, a transmission line estimating circuit 13, a demodulating circuit 14, a slot linking process circuit 15, a de-interleave buffer 16, and a Viterbi decoding circuit 17, and it is adapted to receive the transmission signal S7 which has been transmitted from the transmitting apparatus 1 via the antenna 11, and to input the transmission signal S7 to the receiving circuit 12 as a reception signal S11. The receiving circuit 12 amplifies the inputted reception signal S11, then, performs frequency conversion with the reception signal S11, takes out a base band signal thereby, performs filtering process with the base band signal, and performs analog-to-digital conversion process with the base band signal. In this way, the receiving circuit 12 takes out a reception symbol group S12 which corresponds to the above-mentioned transmission symbol group S6, and outputs the reception symbol group S12 to the transmission line estimating circuit 13.

The transmission line estimating circuit 13, which is a circuit for examining the characteristics of the transmission line and for performing the equalize process based on the result of the examination, estimates the characteristics of the transmission line by referring to the pilot symbol P which is included in the reception symbol group S12, and calculates the inverse characteristics of the transmission line on the basis of the result of the estimation. Then, the transmission line estimating circuit 13 performs the convolutional multiplication, of the numerical value which is indicating the inverse characteristics of the transmission line in the temporal region, with respect to each information symbol portion of the reception symbol group S12, employing the equalizing circuit which comprises an equalizer, so that it eliminates the influences such as fading, etc. which have been exerted at the transmission line. By this processing, the transmission line estimating circuit 13 restores the information symbol group S5 which has been transmitted, and outputs this information symbol group to the demodulating circuit 14 as the reception information symbol group S13.

The demodulating circuit 14 performs the stated demodulation process with the reception information symbol group S13, so as to restore the coded bit group S14 which corresponds to the coded bit group S4 of the transmission side, and then outputs this to the slot linking process circuit 15. Besides, as noise components have been added to the coded bit group S14 at the transmission line, each bit of the coded bit group S14 is not a binary signal which takes a value "1" or a value "0", but is a multiple-valued signal. The slot linking process circuit 15, is a circuit for linking the coded bit group S14 which is fragmentarily obtained in units of a slot in order to become a continuous signal. It links the coded bit group S14 together when the coded bit group S14 have been accumulated by the quantity which corresponding to the storage capacity of the de-interleave buffer 16 of the succeeding stage, and then outputs a processed coded bit sequence S15 to the de-interleave buffer 16.

The de-interleave buffer 16, which has the storage capacity corresponding to the plural slots, stores the supplied coded bit sequence S15 in the internal storage region sequentially, and rearranges the order of the coded bit sequence S15 in the inverse procedure of rearranging performed in the interleave buffer 3 of the transmitting apparatus 1, so as to return it to the original order, and then outputs a coded bit sequence S16 to the Viterbi decoding circuit 17 (hereinafter, this returning to the original order is referred to as de-interleaving). The Viterbi decoding circuit 17, which comprises a soft decision Viterbi decoding circuit, considers a trellis of convolutional code on the basis of the inputted coded bit sequence S16, estimates the most likely state out of all state transitions which can be taken by the data (so-called maximum likelihood sequence estimation), restores thereby a transmitted information bit sequence S18, and outputs this.

By the way, in such conventional receiving apparatus 10, the symbols are temporally arranged in each slot and sent, as it is adapted to eliminate influences which have been exerted through the transmission line by performing convolutional multiplication of the temporal region employing the equalizing circuit which comprises an equalizer. In this connection, there is such a problem that the configuration of the receiving apparatus is complicated. Besides, in the above-mentioned TDMA mode, communication quality may be different depending upon the timing of the transmission slot TX; in such conventional receiving apparatus 10, the reliability which indicates the communication quality of the transmission slot TX has not been arranged to reflect on the coded bit which has been sent by that slot. Therefore, there are such disadvantages that the precision of maximum likelihood sequence estimation of the Viterbi decoding circuit 17 can not be improved, and the transmitted information bit sequence can not be restored with high precision.

SUMMARY OF THE INVENTION

In view of the foregoing, an object of this invention is to provide a receiving apparatus, a transmitting/receiving apparatus and communicating method in which, maximum likelihood sequence estimation with high precision is applied to restore the transmitted information bit sequence with high precision, with a simple constitution.

The foregoing object and other objects of the invention have been achieved by the provision of a receiving apparatus, a transmitting/receiving apparatus, and communicating method, wherein; the characteristics of the transmission line of each symbol group are estimated on the basis of the amplitude and the phases of the pilot symbols which have been extracted from the reception symbol group, and the information symbol group is restored from the reception symbol group on the basis of the result of the estimation, and the coded bit group which has been restored from the information symbol group is multiplied by the weighting factor and caused to reflect the reliability of the transmission line of each symbol group, and maximum likelihood sequence estimation is applied to the coded bit group which is reflecting the reliability, and thereby the information bit sequence is restored.

As a result, by the use of simple configuration, influences given at the transmission line can be eliminated and so the information symbol group can be restored exactly, besides, the reliability of the transmission line of each symbol group can be reflected on the coded bit group, in this way, maximum likelihood sequence estimation can be applied precisely and the transmitted information bit sequence can be restored exactly.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Preferred embodiments of this invention will be described with reference to the accompanying drawings:

(1) Entire Configuration of Radio Communication System

Figure 5:
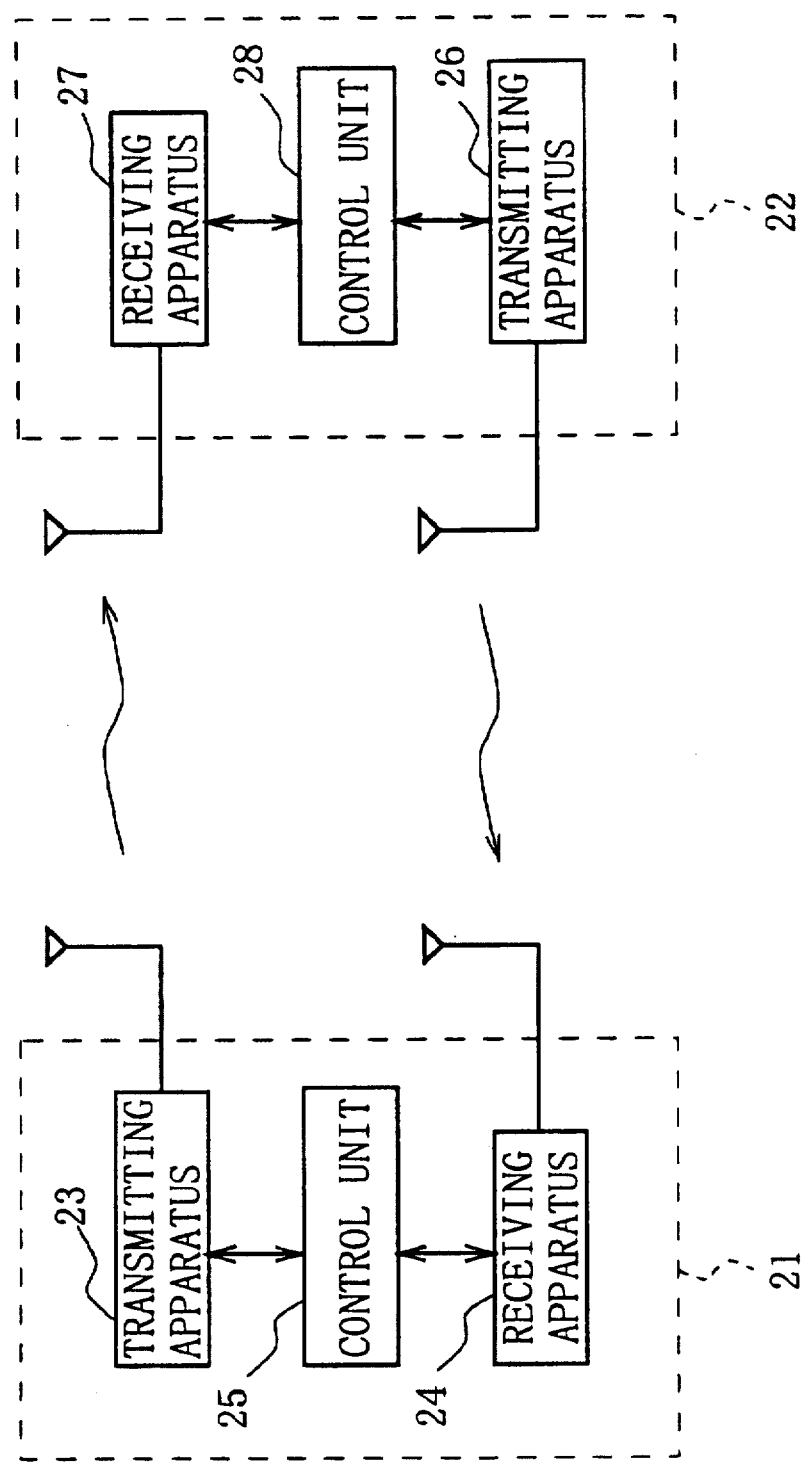
FIG. 5 is a block diagram illustrating a configuration of a radio communication system according to an embodiment of the present invention.

Referring now to FIG. 5, a radio communication system such as a portable telephone system, generally designated as 20 according to the present invention is illustrated, and is composed of base station apparatuses 21 placed within each of cells which is formed by division of the area where the communication service is offered, and portable telephones 22 as the mobile stations for communicating with the base station apparatus 21.

The base station apparatus 21 is composed of a transmitting apparatus 23 for transmitting the information bit sequence toward the portable telephone 22 employing the stated frequency channel, a receiving apparatus 24 for receiving the information bit sequence which has been transmitted from the portable telephone 22 employing the stated frequency channel, and a control unit 25 for controlling the operations of the transmitting apparatus 23 and the receiving apparatus 24 and for managing the frequency channel which is employed to communicate with the portable telephone 22. Similarly, the portable telephone 22 is composed of a transmitting apparatus 26 for transmitting the information bit sequence toward the base station apparatus 21 employing the stated frequency channel, a receiving apparatus 27 for receiving the information bit sequence which has been transmitted from the base station apparatus 21 employing the stated frequency channel, and a control unit 28 for controlling the operations of the transmitting apparatus 26 and the receiving apparatus 27 and for managing the frequency channel which is employed to communicate with the base station apparatus 21.

In the case of this radio communication system 20, plural frequency channels, which are employed for communication between the base station apparatus 21 and the portable telephones 22, have been provided, and arbitrary one pair of frequency channels out of them are employed for communication from the base station apparatus 21 toward the portable telephone 22 and for communication from the portable telephone 22 toward the base station apparatus 21. In this case, each frequency channel is composed of, for instance, 24 sub-carriers; on communication, the transmitted information bit sequence is distributed and superimposed on the sub-carriers, and so-called multi-carrier communication is performed. At this time, this radio communication system 20 is adapted to partition the transmitted information bit sequence in units of a slot, and to distribute and superimpose the partitioned information bit sequence on the above-mentioned sub-carriers. Besides, this radio communication system 20 is adapted to perform so-called frequency hopping, that is, to alter the employed frequency channel at random for each slot on the basis of the previously determined pattern, so as to reduce the influences of interference wave received from the other communication.

At this point, the transmitting apparatuses 23, 26, and the receiving apparatuses 24, 27 which have been mounted on the base station apparatus 21 and the portable telephone 22 will be concretely described. Since, the transmitting apparatus 23 and the transmitting apparatus 26 have the same configurations, and the receiving apparatus 24 and the receiving apparatus 27 also have the same configurations, only the transmitting apparatus 23 and the receiving apparatus 27 will be described herein.

(2) Configuration of Transmitting Apparatus

Figure 1:
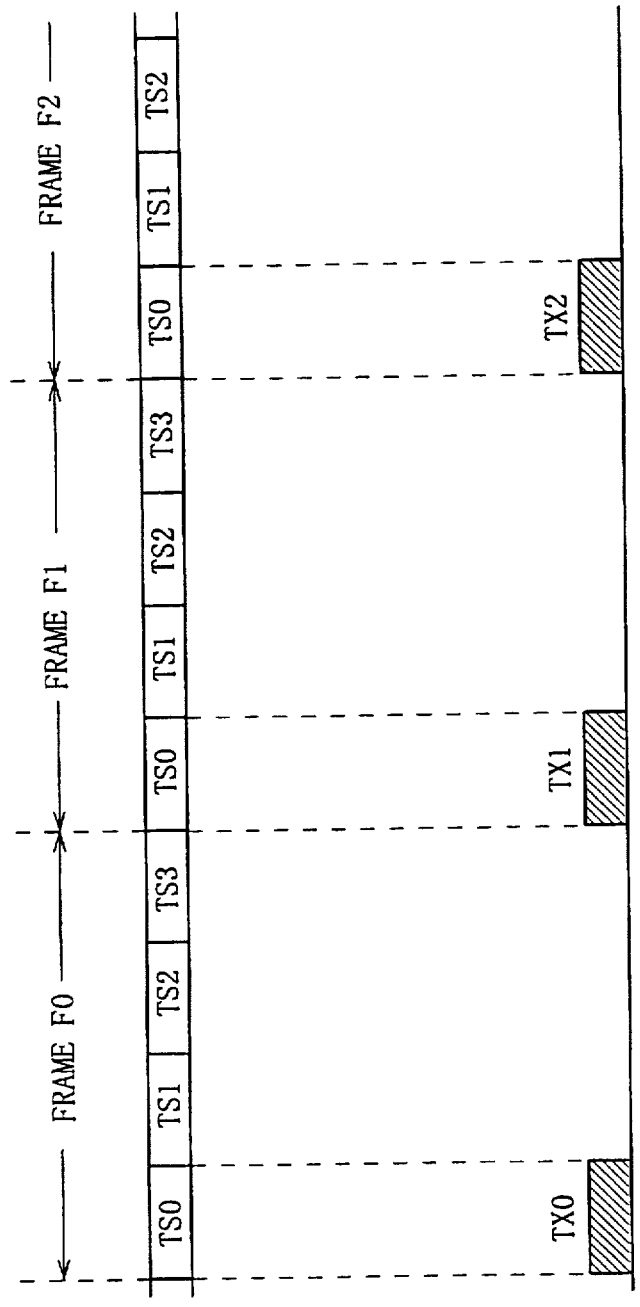
FIG. 1A and 1B are schematic diagrams used for explaining the principle of TDMA system.
Figure 2:
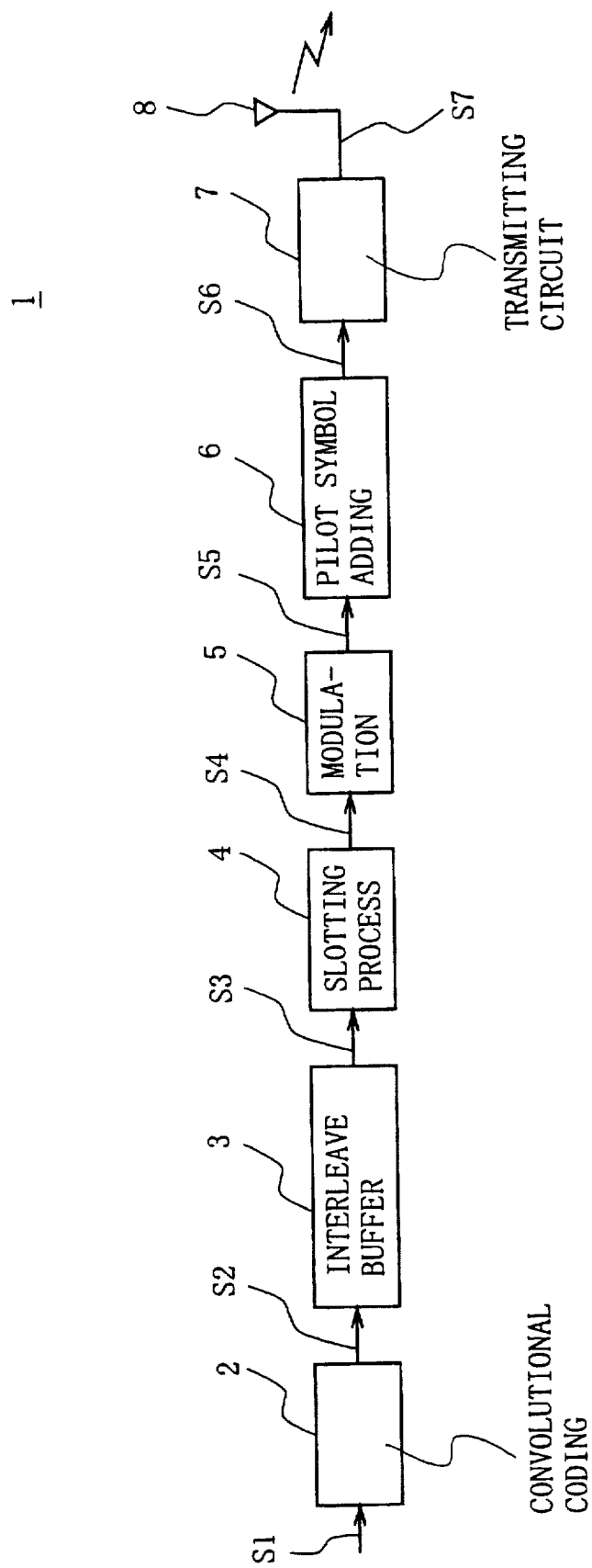
FIG. 2 is a block diagram illustrating the configuration of the conventional transmitting apparatus.
Figure 6:
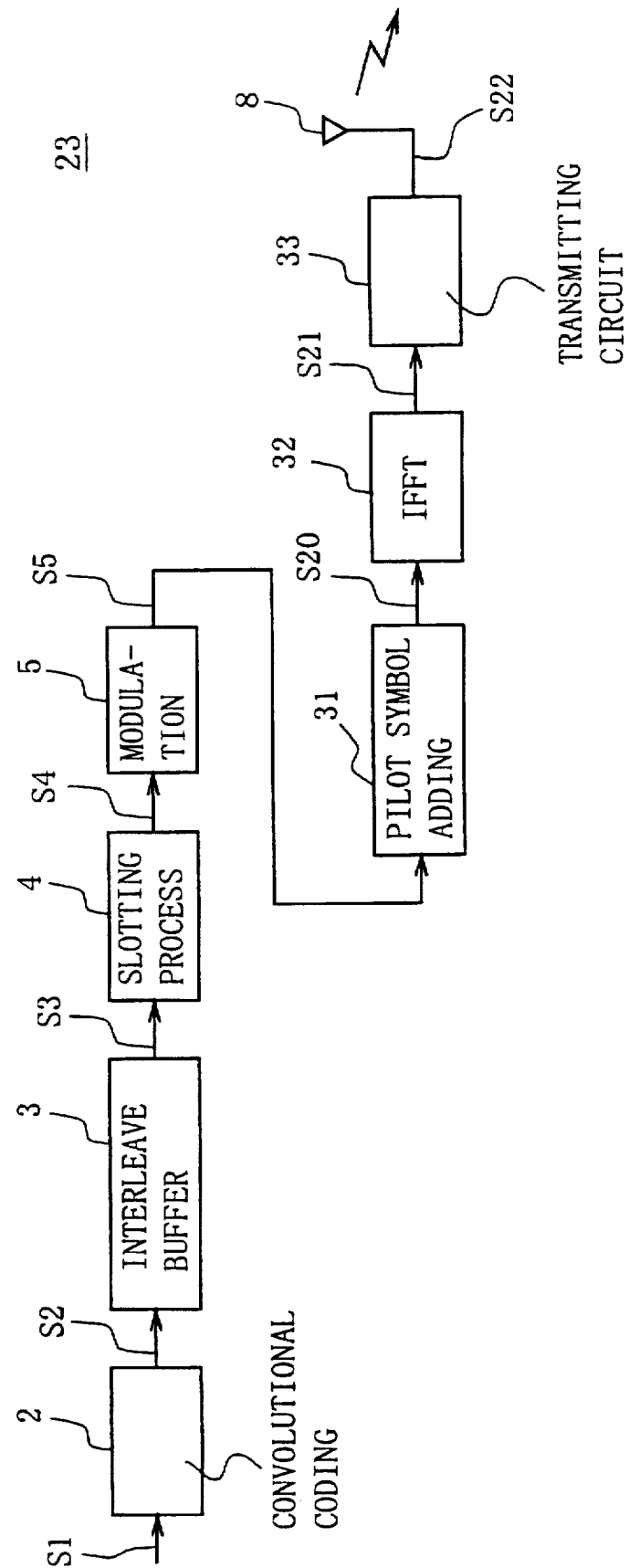
FIG. 6 is a block diagram illustrating a configuration of the transmitting apparatus of the radio communication system.

The configuration of the transmitting apparatus 23 is first described in this paragraph. As shown in FIG. 6, which has the same reference numerals as those of FIG. 2 on the corresponding portions, the transmitting apparatus 23 roughly comprises a convolutional coding circuit 2, an interleave buffer 3, a slotting process circuit 4, a modulating circuit 5, a pilot symbol adding circuit 31, an inverse fast Fourier transformation circuit (IFFT) 32, a transmitting circuit 33, and an antenna 8. The transmitting apparatus 23 has a nearly same configuration as the transmitting apparatus 1 shown in FIG. 2, excepting that the inverse fast Fourier transformation circuit 32 has been added and that the contents of the processing of the pilot symbol adding circuit 31 and the transmitting circuit 33 have been changed.

At first, in this transmitting apparatus 23, the coded bit group S4 which has been partitioned by the slotting process circuit 4 is inputted to the modulating circuit 5. The modulating circuit 5 performs modulation processing of synchronous detection system with the inputted coded bit group S4, in the case of the transmitting apparatus 23 also. As the modulation processing, various modulation systems are thinkable, and, for instance, QPSK modulation (Quadrature Phase Shift Keying), 8PSK modulation (8 Phase Shift Keying), 16QAM modulation (16 Quadrature Amplitude Modulation), and 64QAM modulation (64 Quadrature Amplitude Modulation) are typical.

Figure 7:
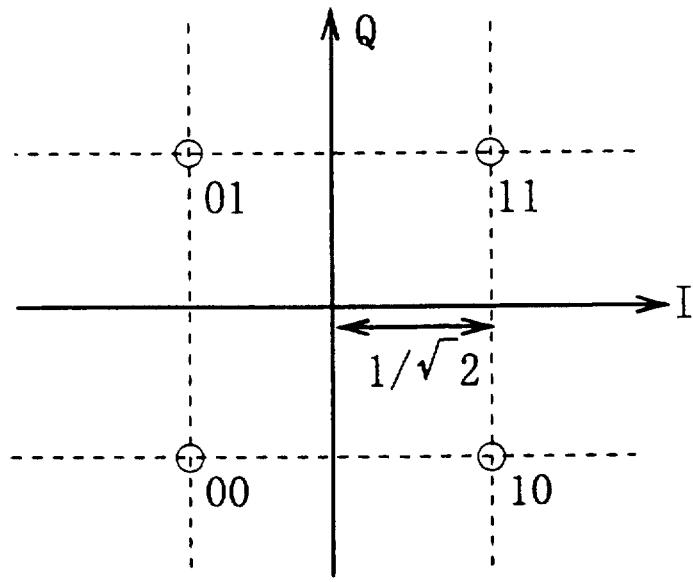
FIG. 7 is a signal point layout drawing used for explaining the principle of QPSK modulation.
Figure 8:
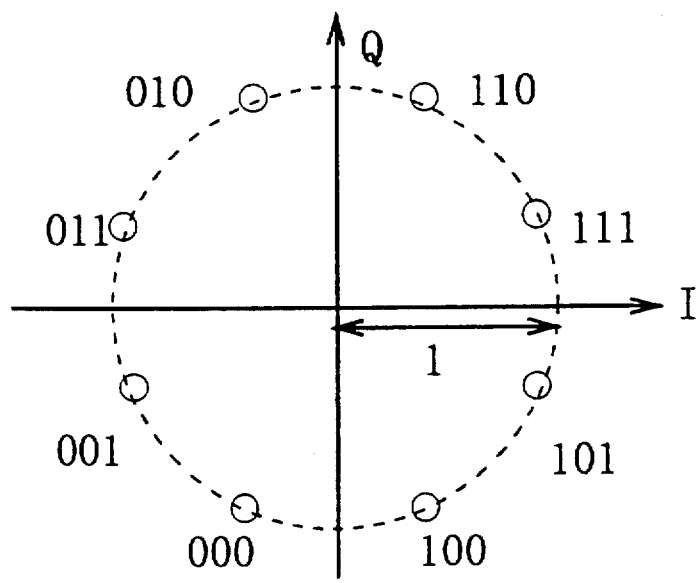
FIG. 8 is a signal point layout drawing used for explaining the principle of 8PSK modulation.
Figure 9:
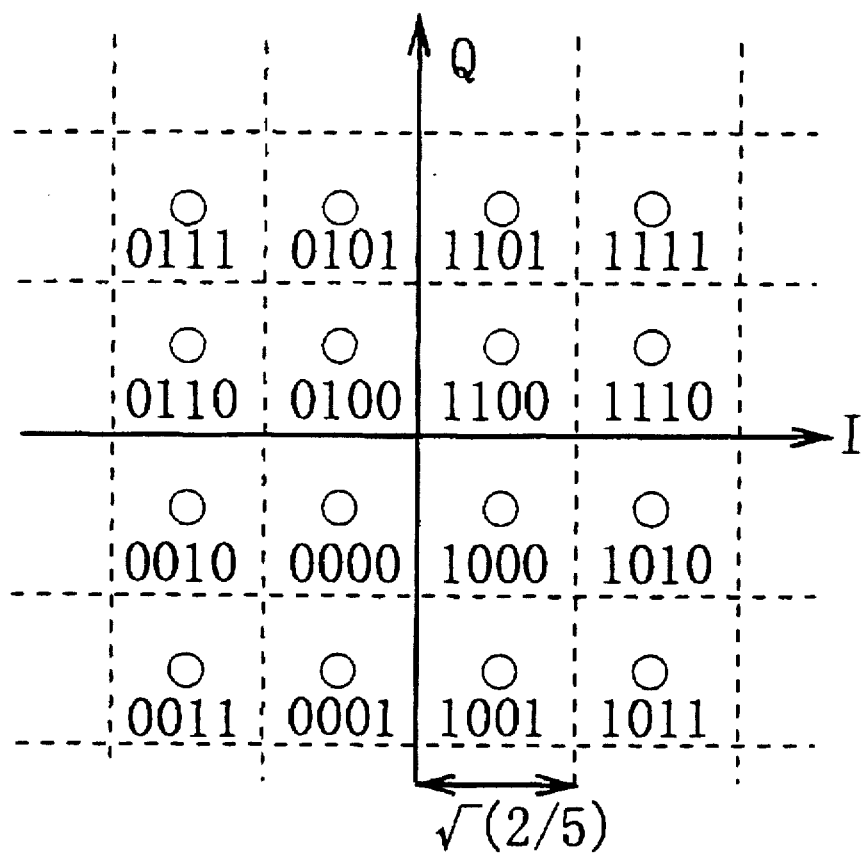
FIG. 9 is a signal point layout drawing used for explaining the principle of 16QAM modulation.
Figure 10:
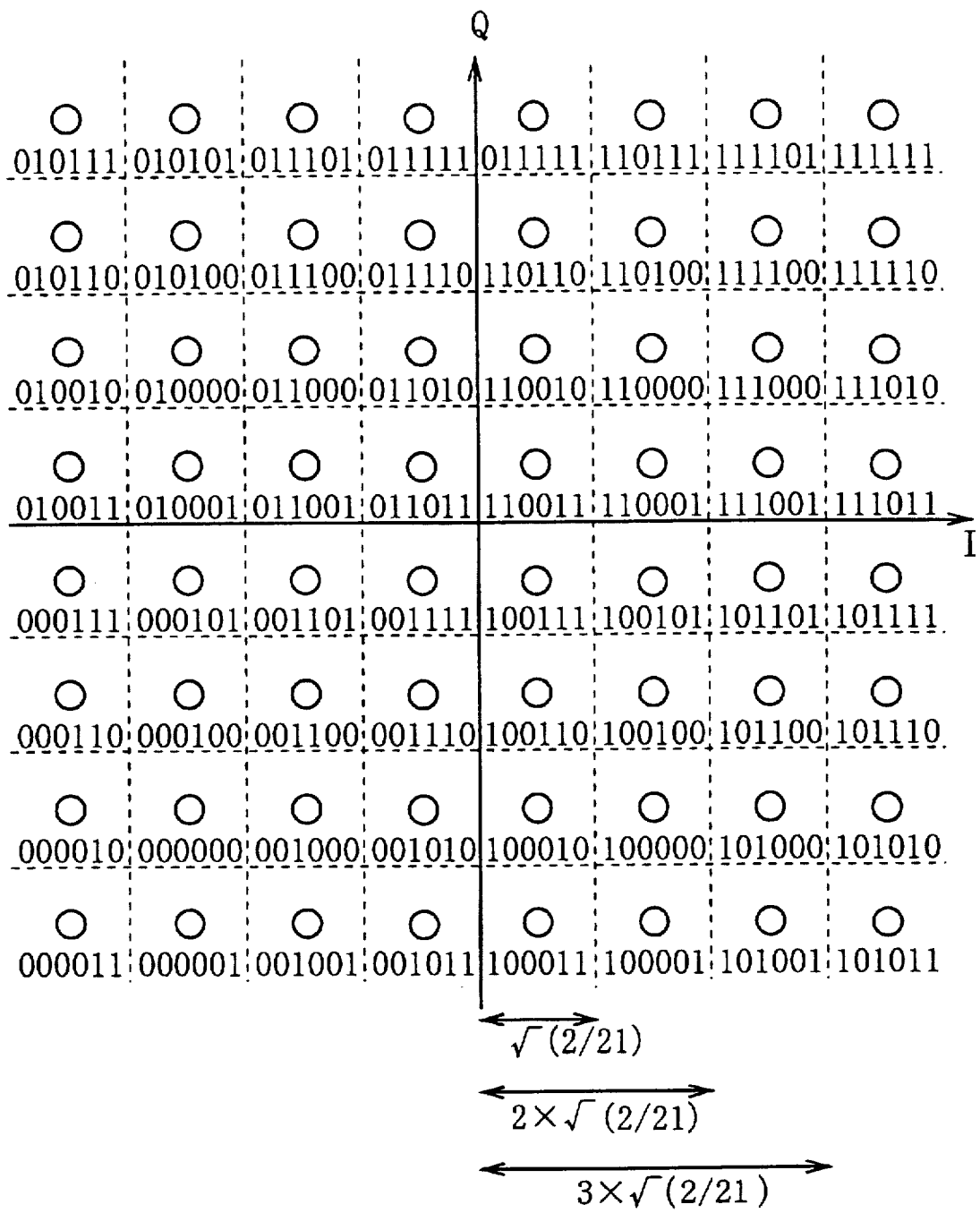
FIG. 10 is a signal point layout drawing used for explaining the principle of 64QAM modulation.

Briefly describing the respective modulation systems at this point, QPSK modulation is phase modulation wherein 4 phase states exist like its name, and is such a modulation system that information which corresponds to 2 bits is represented by 4 kinds of signal points (symbols) which exist at the phase values of $\pi/4$, $3\pi/4$, $5\pi/4$, and $7\pi/4$, as shown in FIG. 7. While, 8PSK modulation is phase modulation wherein 8 phase states exist like its name, and is such a modulation system that 3-bit information is represented by 8 kinds of signal points which exist on the circle of amplitude "1" and their phase values are departing from each other by $\pi/4$, as shown in FIG. 8. While, 16QAM modulation is such modulation that 16 kinds of signal points whose amplitude are different exist like its name, and is such a modulation system that 4-bit information is represented by 16 kinds of signal points which have been produced by respectively dividing the magnitudes of I component and Q component with the threshold value of $\pm\sqrt{2/5}$, as shown in FIG. 9. While, 64QAM modulation is such modulation that 64 kinds of signal points whose amplitude are different exist like its name, and is such a modulation system that 6-bit information is represented by 64 kinds of signal points which have been produced by respectively dividing the magnitudes of I component and Q component with the threshold values of $\pm\sqrt{2/21}\pm 2\times\sqrt{2/21}$, and $\pm 3\times\sqrt{2/21}$, as shown in FIG. 10. In this connection, with respect to FIG. 7–FIG. 10, the numerical values which have been affixed to the signal points are the bit information shown by the signal points.

Figure 11:
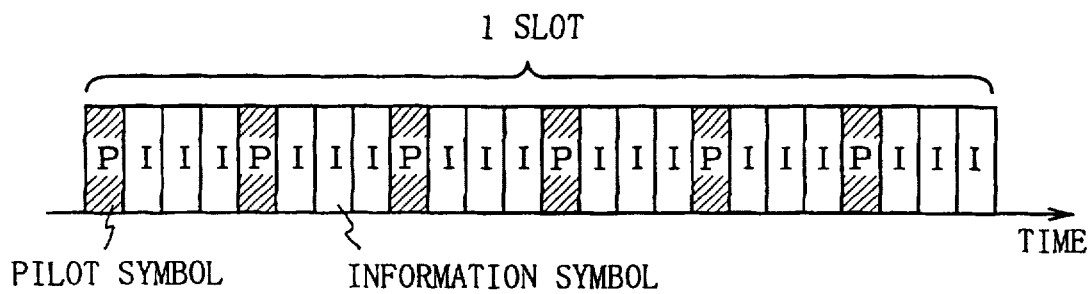
FIG. 11 is a schematic diagram used for explaining an arrangement of pilot symbols.

The modulating circuit 5 performs any processing out of these modulation processes with the coded bit group S4, and then outputs the resulted information symbol group S5 to the succeeding pilot symbol adding circuit 31. The pilot symbol adding circuit 31 is a circuit for adding a pilot symbol P to each symbol group of the information symbol group S5; in the case of this transmitting apparatus 23, as an example is shown in FIG. 11, the pilot symbols P are not added to the forefront position of the symbol group, but the pilot symbols P are inserted in spaces between the information symbols I which form the symbol group.

In this connection, as used herein, 1 slot comprises 24 symbols which are the amount of the pilot symbols P and the information symbols I, since the symbols of 1 slot are distributed to 24 sub-carriers as stated above. The pilot symbol P is a known pattern symbol which is previously seen to the receiving apparatus side, wherein its amplitude value is "1", and its phase value is random. However, with respect to the phase value, it differs from the other communication. This is due to the fact that the receiving apparatus side is adapted to perform estimation of transmission line employing this pilot symbol P, and so, if the other communication and the pilot symbol P are same, estimation of transmission line will be performed with respect to the other communication disadvantageously, and this is to be avoided.

Figure 12:
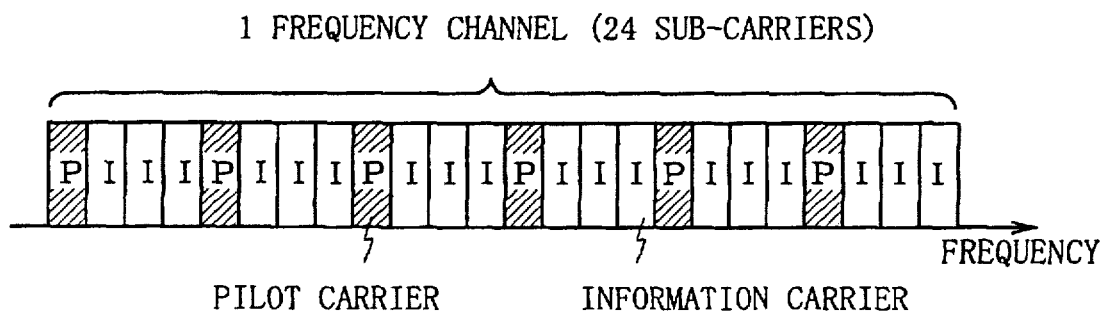
FIG. 12 is a schematic diagram used for explaining transmission symbols which had been exposed to inverse Fourier transformation.

The transmission symbol group S20 which has been produced by adding the pilot symbol P in this way is outputted to the succeeding inverse fast Fourier transformation circuit 32. In order to distribute and superimpose the respective symbols which comprise the transmission symbol group S20 on the above-mentioned 24 sub-carriers (that is, in order to arrange the respective symbols of the transmission symbol group S20 on the axis of frequency, and to transmit it), the inverse fast Fourier transformation circuit 32 performs inverse Fourier transformation with the transmission symbol group S20 respectively. By this, from the inputted symbol group which has been arranged on the axis of time, such a signal is produced that it is arranged on the axis of frequency. At this point, the aspect of the transmission symbol group S21 which has been produced by performing inverse Fourier transformation is shown in FIG. 12. From this FIG. 12, which is showing the aspect of the transmission symbol group S21 based on frequency, such a situation can be seen that, by performing inverse Fourier transformation, 24 symbols which comprise the pilot symbols P and the information symbols I have been arranged on the axis of frequency, and have been allocated to 24 sub-carriers, one to each.

Besides, the inverse fast Fourier transformation circuit 32 is also adapted to perform window-spanning process, what is called windowing process, with the transmission symbol group S21 which has been produced by performing inverse Fourier transformation, and to suppress the unwanted out-of-band spurious thereby. As to the concrete method of windowing process, it can be realized by filtering the transmission symbol group S21 through a cosine roll-off filter on the axis of time. The transmission symbol group S21 is produced in the inverse fast Fourier transformation circuit 32 by this process, and then outputted to the succeeding transmitting circuit 33.

After performing the filtering process with the transmission symbol group S21, the transmitting circuit 33 performs digital-to-analog conversion process with the transmission symbol group S21, to produce the transmission signal. By performing frequency conversion with the transmission signal, the transmitting circuit 33 produces a transmission signal S22 of the stated frequency channel, amplitudes this into the stated electric power, and then transmits this via the antenna 8. The transmitting circuit 33 is adapted to alter the employed frequency channel at random for each slot, on the basis of the pattern which has been previously determined, and to reduce the influences of the interference waves received from the other communication.

In this way, the transmitting apparatus 23 is adapted to perform multi-carrier communication for transmitting a information bit sequence which is the object of transmission with plural sub-carriers, by distributing and superimposing the coded bit group which has been partitioned in units of slot on the plural sub-carriers.

(3) Configuration of Receiving Apparatus

Figure 3:
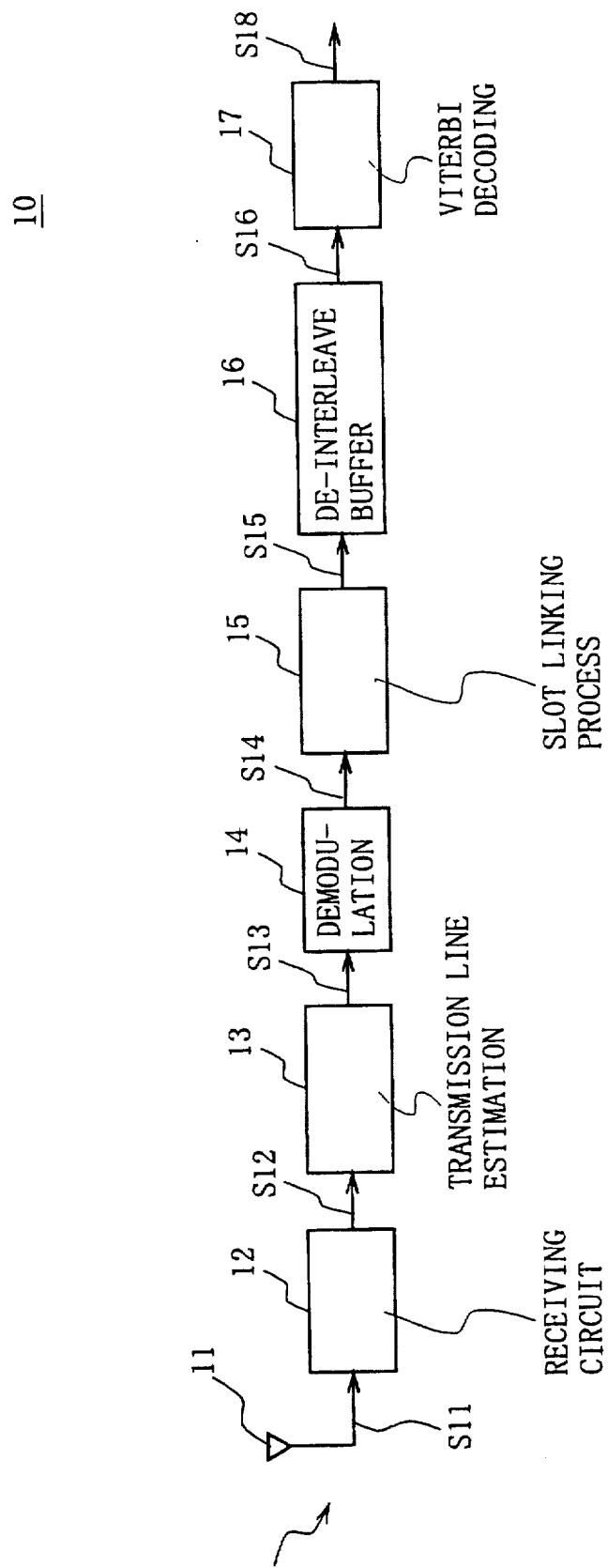
FIG. 3 is a block diagram illustrating the configuration of the conventional receiving apparatus.
Figure 4:
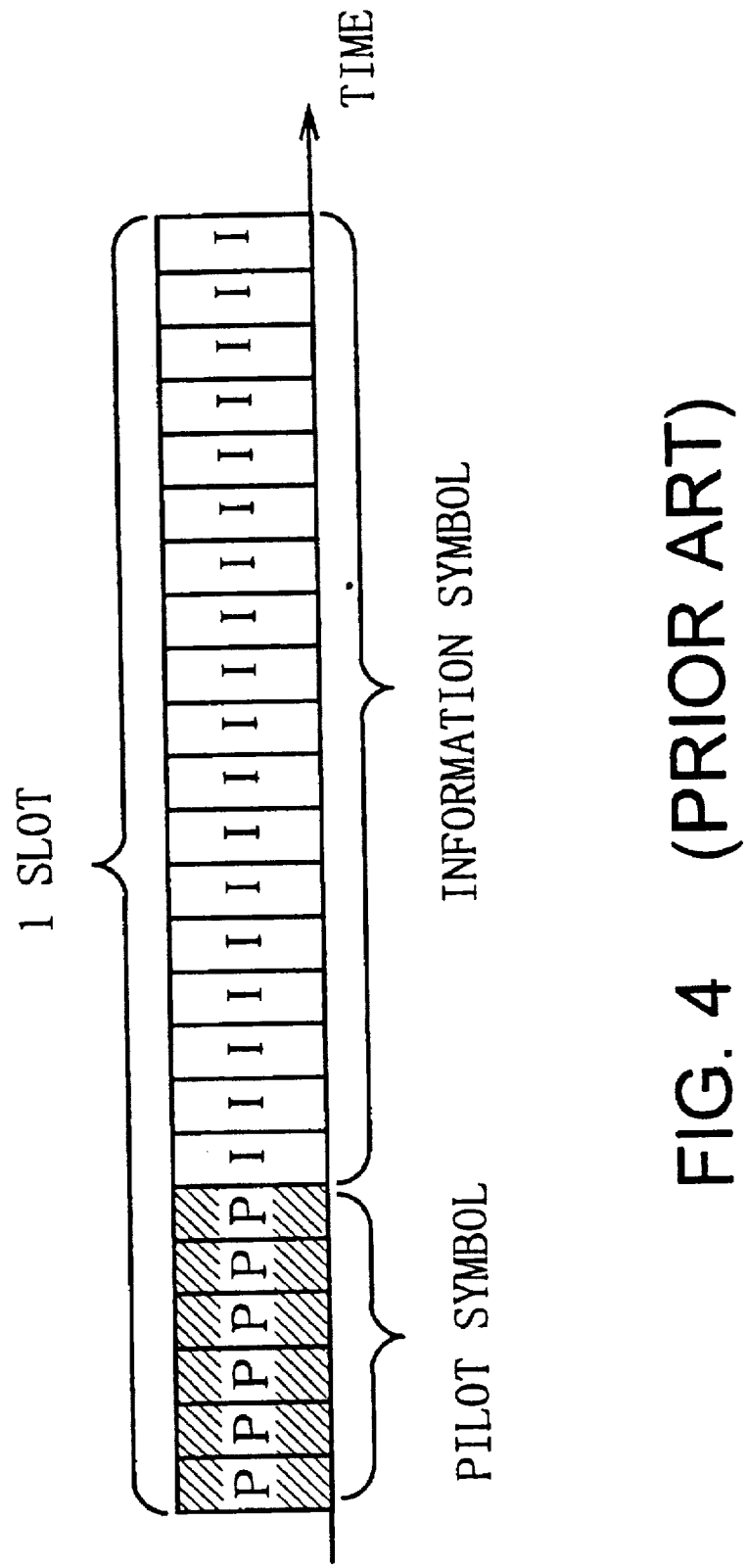
FIG. 4 is a schematic diagram illustrating the arrangement of the conventional pilot symbols.
Figure 13:
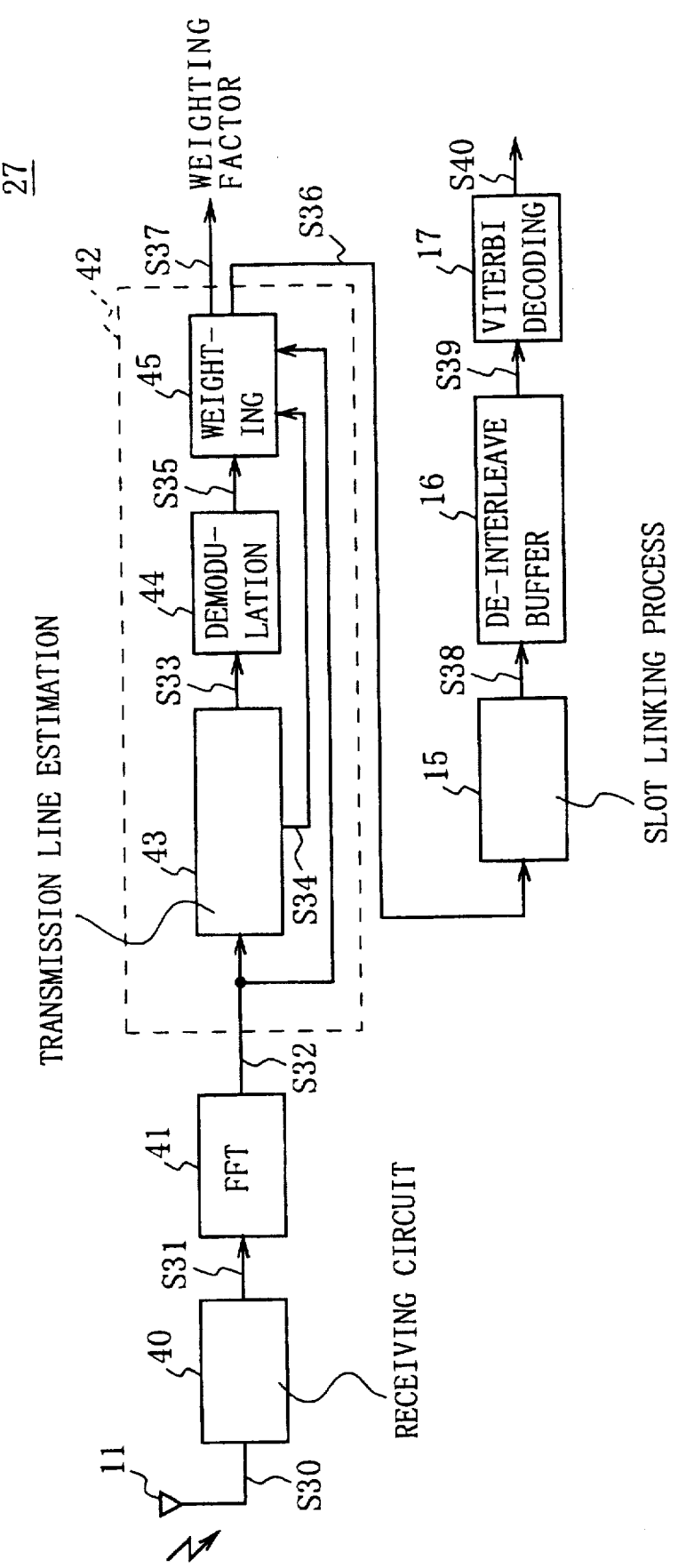
FIG. 13 is a block diagram illustrating a configuration of the receiving apparatus of the radio communication system.

On the other hand, as shown in FIG. 13 which has the same reference numerals as those of FIG. 3 on the corresponding portions, the receiving apparatus 27 roughly comprises an antenna 11, a receiving circuit 40, a fast Fourier transformation circuit (FFT) 41, a demodulating unit 42, a slot linking process circuit 15, a de-interleave buffer 16, and a Viterbi decoding circuit 17 roughly speaking, and having nearly the same configuration as that of the receiving apparatus 10 shown in FIG. 3, excepting that the fast Fourier transformation circuit 41 has been added and that the contents of the processing of the receiving circuit 40 and the demodulating unit 42 have been changed.

The antenna 11 first receives the transmission signal S22 which has been transmitted from the transmitting apparatus 23, and then inputs this to the receiving circuit 40 as a reception signal S30. After amplifying of the inputted reception signal S30, the receiving circuit 40 performs frequency conversion with the reception signal S30 so as to take out the base band signal, performs filtering process with respect to the base band signal, exposes analog-to-digital conversion processing with the base band signal so as to take out a reception symbol group S31, and then outputs the reception symbol group S31 to the fast Fourier transformation circuit 41.

In this connection, the receiving circuit 40 is adapted to alter the receiving frequency channel on the basis of the pattern which is same as that of the transmitting side, and thereby able to correctly perform the receiving operation, keeping pace with the transmitting side, even in the case where the transmitting side has altered the frequency channel.

The fast Fourier transformation circuit 41 performs window-spanning process, what is called windowing process, with the inputted reception symbol group S31, so as to take out a signal component which corresponds to 1 slot, and then performs Fourier transformation with the signal component. In this way, the symbol group which has been taken out in an arranged manner on the axis of frequency, can be produced in an arranged manner on the axis of time. A reception symbol group S32 which has been taken out by performing Fourier transformation in this way is inputted to the succeeding demodulating unit 42. Besides, the fast Fourier transformation circuit 41 is adapted to filter the reception symbol group S31 through a cosine roll-off filter on the axis of time, so as to perform window-spanning process, in the same way as the inverse fast Fourier transformation circuit 32 of the transmitting side.

The demodulating unit 42 is composed of a transmission line estimating circuit 43, a demodulating circuit 44, and a weighting circuit 45, and adapted to input the supplied reception symbol group S32 to the transmission line estimating circuit 43 and the weighting circuit 45. The transmission line estimating circuit 43 extracts the pilot symbol P which is included in the reception symbol group S32, estimates the characteristics of the transmission line of each slot on the basis of the amplitude and the phase of the pilot symbol P, multiplies each information symbol I of the reception symbol group S32 by the value of the reciprocal number of the symbol sequence which shows the result of the estimation for each symbol, to produce the reception information symbol group S33 from which the influence exerted through the transmission line has been eliminated, and then outputs this to the succeeding demodulating circuit 44. Besides, the transmission line estimating circuit 43 outputs the symbol sequence S34 which shows the characteristics of the transmission line to the succeeding weighting circuit 45.

The demodulating circuit 44 exposes the respective reception information symbol group S33 to the stated demodulation process (that is, a demodulation process corresponding to the modulation technique which has been performed at the transmitting side, for instance, a demodulation process corresponding to QPSK modulation, 8PSK modulation, 16QAM modulation, or 64QAM modulation), so that it takes out the coded bit group S35 from the reception information symbol group S33, and then outputs this to the weighting circuit 45. Besides, as noise components have been added to the coded bit group S35 at the transmission line, each bit of this is not a binary signal off "0" or "1", but is a multiple-valued signal.

On the basis of the inputted reception symbol group S32 and the symbol sequence S34 which shows the characteristics of the transmission line, the weighting circuit 45 estimates the reliability of the slot by which the coded bit group S35 has been delivered for each slot, and then calculates the weighting factor which shows the reliability of the slot. Then the weighting circuit 45 multiplies the coded bit group S35 by the calculated weighting factor for each slot, so as to cause each bit of the coded bit group S35 to reflect the reliability of the slot, and outputs the resulted coded bit group S36 to the succeeding slot-linking process circuit 15.

Furthermore, concurrently with this, the weighting circuit 45 outputs a weighting factor S37 which shows the reliability of the slot to the above-mentioned control unit 28. And so, when the control unit 28 is monitoring the weighting factor S37, the control unit 28 is able to easily judge whether the frequency channel which is being employed for the communication is favorable or not, and if not, it is able to immediately alter the frequency channel.

The slot linking process circuit 15, which is a circuit for linking the coded bit group S36 which is fragmentarily obtained in units of a slot in order to become a continuous signal, links the coded bit group S36 together when the coded bit group S36 has been accumulated by the quantity which corresponds to the storage capacity of the de-interleave buffer 16 of the succeeding stage, and then outputs the resulted coded bit sequence S38 to the de-interleave buffer 16.

The de-interleave buffer 16, which has the storage capacity corresponding to the plural slots, stores the supplied coded bit sequence S38 in the internal storage region sequentially, and rearranges the order of the coded bit sequence S38 in the inverse procedure of rearranging performed in the interleave buffer 3 of the transmitting apparatus 23, so as to return it to the original order, and then outputs a resulted coded bit sequence S39 to the Viterbi decoding circuit 17.

The Viterbi decoding circuit 17, which comprises a soft decision Viterbi decoding circuit, applies maximum likelihood sequence estimation to the inputted coded bit sequence S39, so that it restores the transmitted information bit sequence S40. In this case, in the weighting circuit 45 of the preceding stage, the reliability of the slot by which the coded bit group S35 has been delivered has been ever calculated, and the very coded bit group S35 has been ever multiplied by the weighting factor S37 which shows the reliability of the slot. Therefore, the signal level of each bit of the coded bit sequence S39 which is inputted to the Viterbi decoding circuit 17 has already become the level corresponding to the reliability of the slot, and so, even in the case where the communication qualities of the respective slots are different from each other, the signal levels are already reflecting the communication qualities through the reliability. Accordingly, when such a coded bit sequence S39 has been inputted to the Viterbi decoding circuit 17, the Viterbi decoding circuit 17 is able to apply maximum likelihood sequence estimation introducing the reliability of each slot, and so it is able to apply maximum likelihood sequence estimation more precisely, and to restore the information bit sequence S40 more precisely.

(4) Configuration of Transmission Line Estimating Circuit

Figure 14:
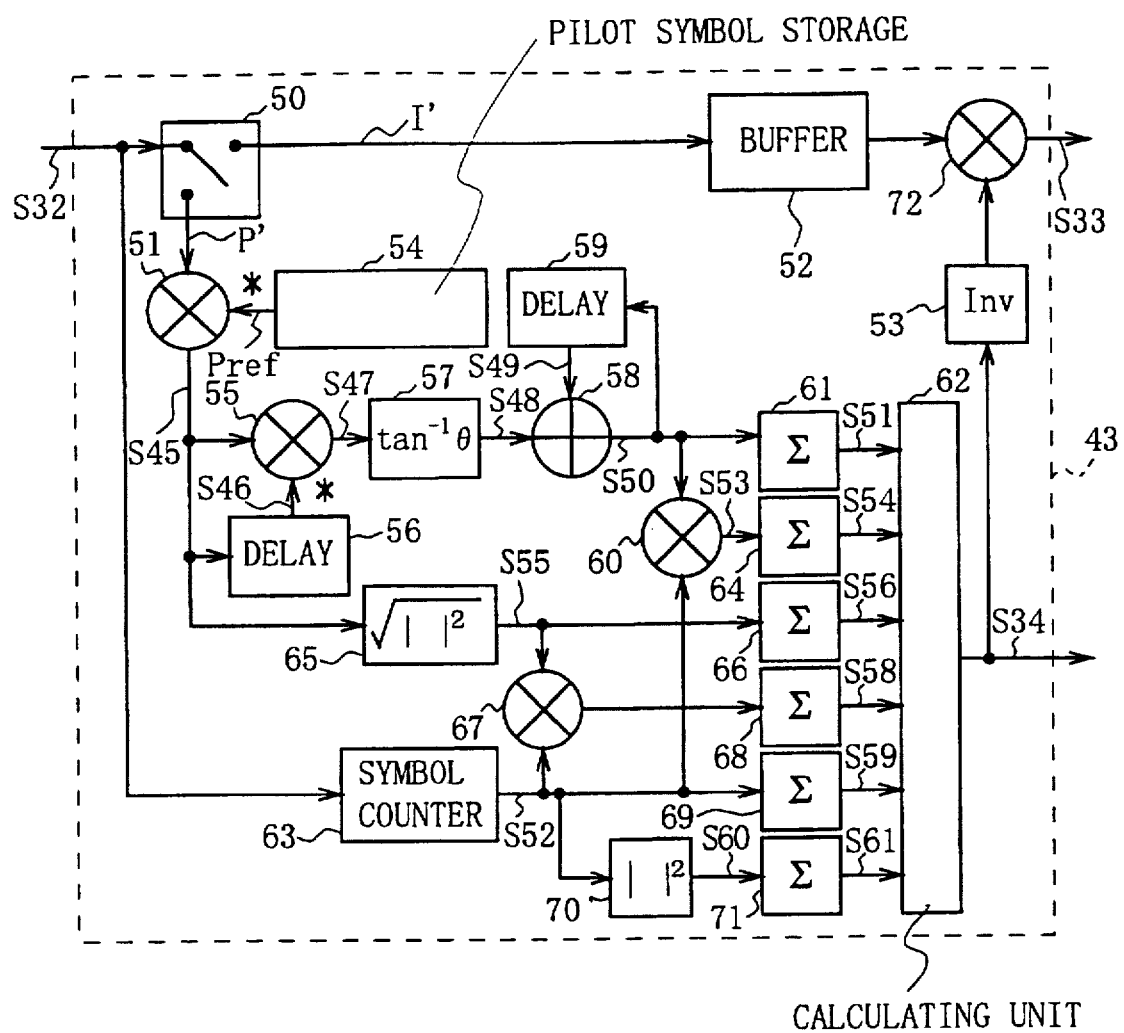
FIG. 14 is a block diagram illustrating a configuration of the transmission line estimating circuit.

Next, in this paragraph, the above-mentioned transmission line estimating circuit 43 is described concretely. In the following description, the pilot symbol P and the information symbol I which are included in the received reception symbol group S32 are referred to as the pilot symbol P' and the information symbol I' respectively. As shown in FIG. 14, in the transmission line estimating circuit 43, the reception symbol group S32 which is supplied from the fast Fourier transformation circuit 41 is first inputted to a signal separating switch 50. This signal separating switch 50 is a switch for separating the pilot symbol P' and the information symbol I' which are included in the reception symbol group S32 from each other, and it is adapted to be switched to the multiplier 51 side at the timing when the reception symbol group S32 is the pilot symbol P', and to be switched to the buffer 52 side at the timing when the reception symbol group S32 is the information symbol I', so as to separate the pilot symbol P' and the information symbol I' from each other.

The buffer 52, which is a storage circuit for accumulating the information symbols I' obtained from 1 slot, sequentially stores the information symbols I' which have been taken out by the signal separating switch 50 in the internal storage region, so as to accumulate the information symbols I' till the quantity which corresponds to 1 slot. Besides, when the information symbols I' which corresponds to 1 slot have been accumulated, the buffer 52 reads the information symbols I' in order, in synchronism with the data output timing of a reciprocal number calculating circuit 53 which is described herein below, and outputs them.

Figure 15:
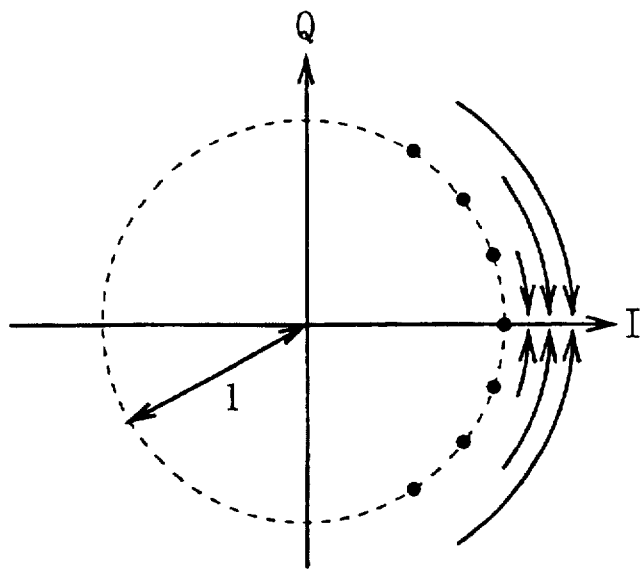
FIG. 15 is a schematic diagram used for explaining the principle of the operation of the multiplier 51 which is included in the transmission line estimating circuit.

On the other hand, each pilot symbol P' which has been taken out by the signal separating switch 50 is inputted to the multiplier 51. To this multiplier 51, a reference pilot symbol $P_{ref}$ which has been read from a pilot symbol storage circuit 54 is inputted, the multiplier 51 performs complex multiplication with the pilot symbol P' and the conjugate value of the reference pilot symbol $P_{ref}$, and thereby, finds the quotient which is given by dividing the pilot symbol P' by the reference pilot symbol $P_{ref}$. Besides, the reference pilot symbol $P_{ref}$ is the same symbol as the pilot symbol P which has been transmitted by the transmitting side, and its amplitude value is "1" and its phase value is coincident with that of the pilot symbol P. Therefore, as shown in FIG. 15, the division process at the multiplier 51 is corresponding to the process of returning the phase value of the received pilot symbol P' to "0" in its principle, and the symbol sequence S45 which is outputted from the multiplier 51 ought to become such symbols that their amplitude values are "1" and all of their phase values are "0".

Figure 16:
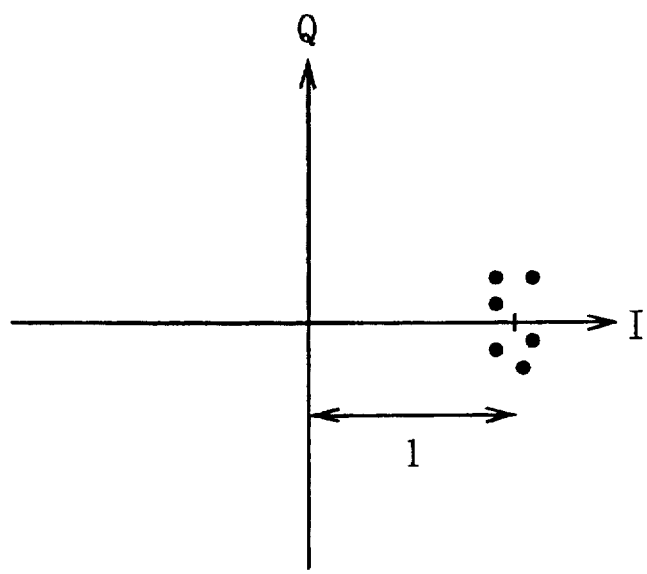
FIG. 16 is a schematic diagram used for explaining the symbol sequence S45 in the transmission line estimating circuit.

However, in fact, because of influences of noises, fading, interference waves, etc. or deviation of windowing processing in the fast Fourier transformation circuit 41, etc., undesirable signal components are included in the reception symbol group S32, and so the received pilot symbol P' never completely coincides with the transmitted pilot symbol P. As a result of this, as shown in FIG. 16, the symbol sequence S45 which is outputted from the multiplier 51 never becomes such symbols that their amplitude values are completely "1" and their phase values are "0".

Therefore, by observing the symbol sequence S45 outputted from the multiplier 51, the characteristics of the transmission line such as noises, fading, etc., the influences of interference waves, etc., and the deviation of windowing processing, etc. can be estimated. So, this transmission line estimating circuit 43 is adapted to estimate the characteristics of the transmission line, etc., by analyzing the symbol sequence S45.

The symbol sequence S45 which has been obtained in this way is inputted to the succeeding multiplier 55 and the delay circuit 56. The delay circuit 56 delays each of symbols of the symbol sequence S45, in order, by the quantity which corresponds to 1 symbol, and outputs the resulted delayed symbol sequence S46 to the multiplier 55. In the multiplier 55, the current symbol which has been given as the symbol sequence S45 is performed complex multiplication by the conjugate value of the preceding symbol, that is the last symbol, which has been given as the delayed symbol sequence S46, a phase difference signal S47 is calculated which shows the phase difference between the current symbol and the preceding symbol thereby, and then the phase difference signal S47 is outputted to the succeeding phase value calculating circuit 57. The phase value calculating circuit 57 calculates the arc tangent function, so-called arctan, of the phase difference signal S47, to obtain the phase difference S48 between the current symbol and the preceding symbol, and outputs this to the following adder 58.

The adder 58 is a circuit for calculating the absolute phase value of the current symbol by adding the phase difference S48 to the absolute phase value of the preceding symbol which has been obtained as the predecessor symbol. The adder 58 adds the phase difference S48 to the absolute phase value S49 of the predecessor symbol which has been obtained by delaying function of a delay circuit 59, so as to calculate the absolute phase value S50 of the current symbol, and then outputs this to the delay circuit 59, a multiplier 60, and a cumulative addition circuit 61.

In this connection, for the reason that the absolute phase value of the current symbol is found by calculating the phase difference between the current symbol and the preceding symbol and by adding the phase difference to the absolute phase value of the preceding symbol, even though $2\pi$ or more phase rotations of the symbol sequence S45 exist as a whole, the direction of phase rotation can be judged so long as the phase difference between the symbols is less than $\pi$, so the absolute phase value of each symbol can be surely calculated. As used herein, the absolute phase value refers to the actual quantity of rotation; when it is $5\pi/2$ rotations as an example, it is not treated as $\pi/2$, but is treated as $5\pi/2$ which is the actual quantity of rotation.

The cumulative addition circuit 61 is a circuit for performing cumulative addition of the absolute phase values obtained from the symbol sequence S45 of the quantity which corresponds to 1 slot. The cumulative addition circuit 61 cumulates the inputted absolute phase values S50, and outputs a cumulative phase value S51 to a calculating unit 62. On the other hand, the multiplier 60 multiplies the absolute phase value S50 which is supplied from the adder 58 by the symbol number S52 which is supplied from a symbol counter 63 which will be described herein below, to obtain a value S53 of the product of the absolute phase value and the symbol number with respect to each symbol, and then outputs this to the cumulative addition circuit 64. The cumulative addition circuit 64 performs cumulative addition with the product values S53 which have been obtained from the symbol sequence S45 of the quantity which corresponds to 1 slot, and then outputs the result as an accumulated value S54 to the calculating unit 62.

The above-mentioned symbol sequence S45 is inputted to an amplitude calculating circuit 65 also. The amplitude calculating circuit 65 squares each symbol of the symbol sequence S45, and finds the square root of the squared result, so as to calculate the amplitude of each symbol of the symbol sequence S45; then, it outputs this to a cumulative addition circuit 66 and to a multiplier 67, as an amplitude value S55.

The cumulative addition circuit 66 performs cumulative addition with the amplitude values S55 which have been obtained from the symbol sequence S45 of the quantity which corresponds to 1 slot, so as to accumulate the amplitude values of the respective symbols, and then outputs the result as an accumulated amplitude value S56 to the calculating unit 62. On the other hand, the multiplier 67 multiplies the amplitude value S55 which is supplied from the amplitude calculating circuit 65 by the symbol number S52 which is supplied from a symbol counter 63 which will be described herein below, obtains hereby the value S57 of the product of the amplitude value and the symbol number with respect to each symbol, and then outputs the value S57 to the cumulative addition circuit 68. The cumulative addition circuit 68 performs cumulative addition with the product values S57 which have been obtained from the symbol sequence S45 of the quantity which corresponds to 1 slot, and outputs the result as an accumulated value S58 to the calculating unit 62.

By the way, this transmission line estimating circuit 43 is adapted to input the reception symbol group S32 to the symbol counter 63 also. The symbol counter 63 is a circuit for checking what order of symbol in the slot is the pilot symbol P which is being inputted at present, by counting the number of the symbols of the reception symbol group S32 on the basis of the symbol clock; the symbol counter 63 outputs the result as a symbol number S52 to the multipliers 60 and 67 as stated above, and also outputs the symbol number S52 to a cumulative addition circuit 69 and a squaring circuit 70.

The cumulative addition circuit 69 performs cumulative addition of the symbol numbers S52 which have been obtained from the respective pilot symbols P' of 1 slot, and outputs the accumulated value S59 of the symbol numbers which has been obtained as the result to the calculating unit 62. While, the squaring circuit 70 calculates the squared values S60 of the symbol numbers S52, and outputs the results to the following cumulative addition circuit 71. The cumulative addition circuit 71 performs cumulative addition with the squared values S60 of the symbol numbers, by the quantity which corresponds to 1 slot, and then outputs the result as an accumulated value S61 of the squared values of the symbol numbers to the calculating unit 62.

The calculating unit 62 is a circuit for calculating the symbol sequence S34 which shows the above-mentioned characteristics of the transmission line, on the basis of the respective values (S51, S54, S56, S58, S59, and S61) which have been obtained in this manner. The symbol sequence S34 which is calculated by the calculating unit 62 is comprised of the symbols for showing the values of amplitude variation of the reception symbol group S32 in which the amplitude is varying and for showing the quantity of phase rotation which have been effected on the reception symbol group S32. This symbol sequence S34 is referred to as a reference symbol sequence S34, hereinafter.

The reference symbol sequence S34 which has been calculated by the calculating unit 62 is outputted to the weighting circuit 45 of the succeeding stage as stated above, and also outputted to the reciprocal number calculating circuit 53. The reciprocal number calculating circuit 53 finds the reciprocal values of the each symbol of the reference symbol sequence S34, and outputs these to a multiplier 72. In this connection, these reciprocal values of the reference symbols S34 are showing the inverse characteristics of the transmission line characteristics. The reciprocal number calculating circuit 53 outputs only the reciprocal values which correspond to the information symbols I' out of the calculated reciprocal values of the reference symbol sequence S34.

In the multiplier 72, each of the information symbols I' which are outputted from the buffer 52 are preformed complex multiplication by the reciprocal values of the reference symbol sequence S34 which are supplied via the reciprocal number calculating circuit 53, and the phase rotation and the amplitude variation which have been undergone by the information symbols I' are eliminated. Then the multiplier 72 outputs the resulted reception information symbol group S33 to the demodulating circuit 44 as stated above.

(5) Method for Producing Reference Symbol Sequence

Figure 17:
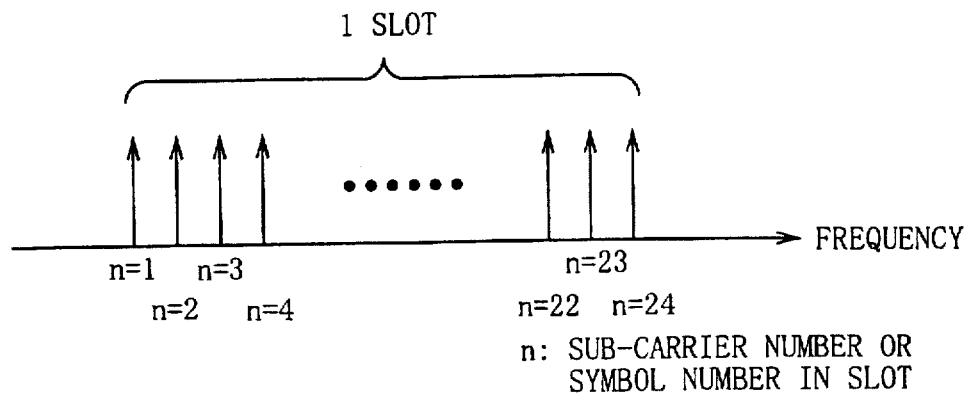
FIG. 17 is a schematic diagram used for explaining the method for producing the reference symbol sequence in the transmission line estimating circuit.

The method for producing the reference symbol sequence at the calculating unit 62 is described below. Prior to describing the concrete method for producing the reference symbol sequence, the principle of the producing method is first explained. As shown in FIG. 17, the transmitting apparatus 23 superimposes the transmission symbol group S5 of the quantity which corresponds to 1 slot to the respective 24 sub-carriers, allotting one to each, and then transmits them. The sub-carriers on which the transmission symbol group S5 has been superimposed is exposed to the stated transmission process such as frequency conversion process, and then transmitted via the antenna 8. The transmission signal S22 which has been transmitted from the antenna 8 undergoes influences such as frequency selective fading through the transmission line, and then reaches to the receiving apparatus 27. The receiving apparatus 27 receives this transmitted signal S22, and takes out the base band signal; then, the receiving apparatus 27 exposes this signal to Fourier transformation, so as to take out the reception symbol group S32 which corresponds to the transmission symbol group S5.

Figure 18:
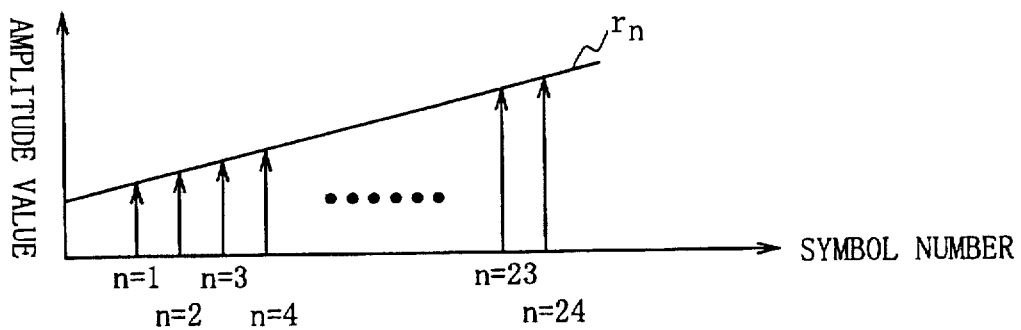
FIG. 18 is a schematic diagram used for explaining the method for producing the reference symbol sequence in the transmission line estimating circuit.
Figure 19:
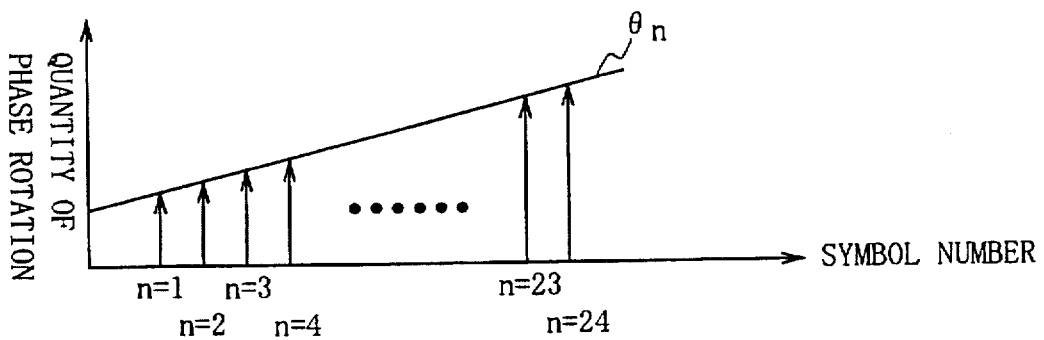
FIG. 19 is a schematic diagram used for explaining the method for producing the reference symbol sequence in the transmission line estimating circuit.

By the way, the amplitude of this reception symbol group S32 is varying and its phases are rotating with respect to the transmission symbol group S5, because they undergo the influence of frequency selective fading through the transmission line as stated above, or undergo the influence of some interference waves, and besides, there are some errors in the window-spanning process of the time of performing Fourier transformation. Referring now to FIG. 18 and FIG. 19, an example of amplitude variation and an example of phase rotation of this reception symbol group S32 are shown. As shown in FIG. 18, the amplitude value of each symbol of the reception symbol group S32 varies for each symbol, because of amplitude variation.

By the way, the value of amplitude of each symbol whose amplitude has varied is generally represented by an amplitude function rn, and the amplitude function rn is usually represented by a function of degree m with symbol number n as a parameter. However, when this amplitude function rn is approximated within a practically sufficient range, it is represented by the linear function of symbol number n, which is shown in the following equation $$r_n = \phi r \cdot n + \xi r \qquad (1)$$

where $\phi r$ denotes a linear coefficient, and $\xi r$ denotes a coefficient of degree zero (that is, the initial-value). Therefore, when the amplitude function rn which is shown in this Equation (1) has been found from the reception symbol group S32 which has been actually received, it is able to produce the reference symbol sequence S34 which shows the amplitude value of each symbol whose amplitude is varying, by using the amplitude function rn. Namely, the respective values (S56, S58, S59 and S61) are found from the pilot symbols P' which are included in the reception symbol group S32 as stated above, and then, employing these values, the linear coefficient $\phi r$ and the coefficient of degree zero $\xi r$ of the amplitude function rn are found, so that the reference symbol sequence S34 is produced.

As to phase rotation, the quantity of phase rotation varies for each symbol of the reception symbol group S32 in like manner, as shown in FIG. 19. The quantity of phase rotation which has been undergone by each symbol is generally represented by a phase function θn, and the phase function θn is usually represented by a function of degree m, with symbol number n as a parameter. However, when this phase function θn is approximated within a practically sufficient range, it is represented by the linear function of symbol number n, which is shown in the following equation $$\theta_n = \phi\theta \cdot n + \xi\theta \qquad (2)$$

here $\phi\theta$ denotes a linear coefficient, and $\xi\theta$ denotes a coefficient of degree zero (that is, the initial-value). Therefore, when the phase function θn which is shown in this Equation (2) has been found from the reception symbol group S32 which has been actually received, it is able to produce the reference symbol sequence S34 which shows the value of the phase rotation which has been undergone by each symbol of the reception symbol group S32, by using the phase function θn. Namely, the respective values (S51, S54, S59 and S61) are found from the pilot symbols P' which are included in the reception symbol group S32 as stated above, and then, employing these values, the linear coefficient $\phi\theta$ and the coefficient of degree zero $\xi\theta$ of the phase function θn are found, so that the reference symbol sequence S34 is produced.

At this point, a concrete method for producing the reference symbol sequence S34 is explained. The calculating unit 62 obtains the linear coefficient $\phi r$ and the coefficient of degree zero $\xi r$ of the amplitude function rn and also obtains the linear coefficient $\phi\theta$ and the coefficient of degree zero $\xi\theta$ of the phase function θn, by substituting the respective values on the following equations which are based on the method of least squares $$\phi r = (G \times D - C \times E)/(G \times F - E \times E) \quad (3)$$

$$\xi r = (C - \phi r \times E)/G \quad (4)$$

$$\phi\theta = (G \times B - A \times E)/(G \times F - E \times E) \quad (5)$$

$$\xi\theta = (A - \phi\theta \times E)/G \quad (6)$$

where A denotes a value of the accumulated phase value S51 which is the cumulation of the absolute phase value of each symbol, B denotes the cumulation value S54 which is the cumulation of the product of the absolute phase value and the symbol number, C denotes the accumulated amplitude value S56 which is the cumulation of the amplitude value of each symbol, D denotes the cumulation value S58 which is the cumulation of the product of the amplitude value and the symbol number, E denotes the value S59 of the cumulation of the symbol number, F denotes the cumulation value S61 which is the cumulation of the squared value of the symbol number, and G denotes the total sum of the number of the pilot symbols P' in 1 slot.

Then, the calculating unit 62 finds the amplitude function rn and the phase function θn which are respectively shown in Equation (1) and Equation (2) employing the found coefficients $\phi r$, $\xi r$, $\phi\theta$, and $\xi\theta$; the unit 62 finds the amplitude value of each symbol which has undergone amplitude variation, and finds the value of phase rotation which has been undergone by each symbol, by sequentially substituting the symbol number n for the amplitude function rn and the phase function θn; then it produces the reference symbol sequence S34 which shows these amplitude variation value and phase rotation quantity.

In this way, by supplying this reference symbol sequence S34 to the multiplier 72 via the reciprocal number calculating circuit 53, the multiplier 72 is able to eliminate the amplitude variation and the phase rotation which have been effected by frequency selective fading, etc. from the information symbol I' for each symbol, and able to perform the accurate restoring of the information symbols. In this connection, in such a case where the window-spanning processing of the fast Fourier transformation circuit 41 has deviated, usually, such a phenomenon occurs that the phases of each of symbols are excessively rotated with the equal intervals, however, this phase rotation components can be also eliminated through the above-mentioned processing of the multiplier 72.

(6) Configuration of Demodulating Circuit

Next, the above-mentioned demodulating circuit 44 is described in this paragraph. The configuration of this demodulating circuit 44 is altered according to the modulation techniques of the transmission side, and so the configurations are described for the respective modulation techniques herein.

(6-1) Configuration of Demodulating Circuit corresponding to QPSK modulation

Figure 20:
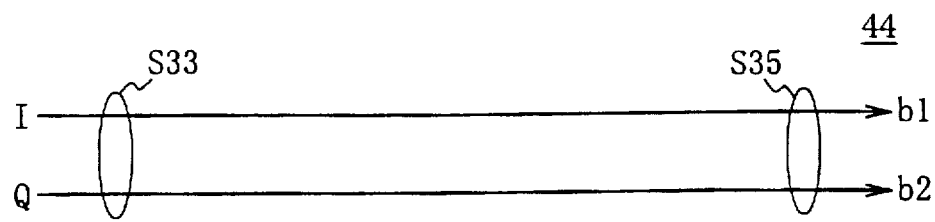
FIG. 20 is a block diagram illustrating a configuration of the demodulating circuit which is corresponding to QPSK modulation.

In the case where the modulation technique which is employed in the transmitting side is QPSK modulation, the demodulating circuit 44 is composed as shown in FIG. 20, and the circuit 44 is arranged such that it should take out I component and Q component of each symbol which has been received as the reception information symbol group S33 as they are, as a first and a second soft decision bits b1 and b2 respectively, and output the very first and the second soft decision bits b1 and b2 as the restored coded-bit group S35.

(6-2) Configuration of Demodulating Circuit corresponding to 8PSK modulation

Figure 21:
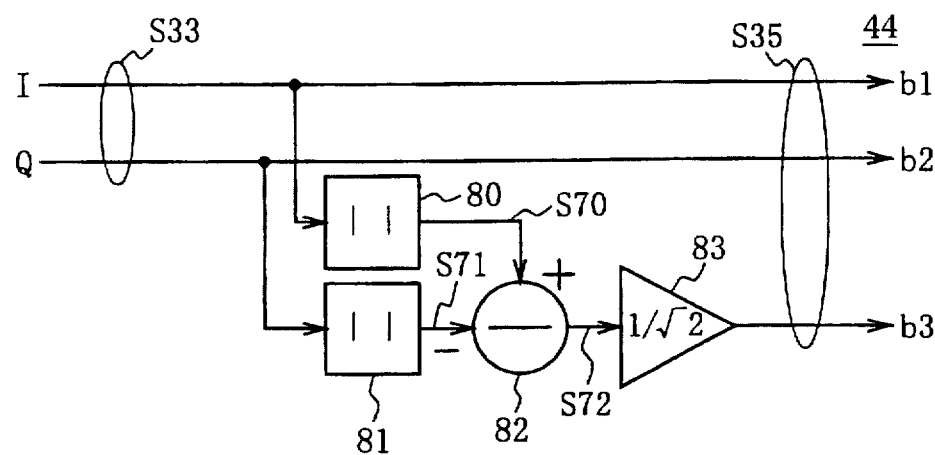
FIG. 21 is a block diagram illustrating a configuration of the demodulating circuit which is corresponding to 8PSK modulation.

In the case where the modulation technique which is employed in the transmitting side is 8PSK modulation, the demodulating circuit 44 is composed as shown in FIG. 21, and the circuit 44 is arranged such that it should take out I component and Q component of each symbol which has been received as the reception information symbol group S33 as they are, as a first and a second soft decision bits b1 and b2 respectively, perform the stated arithmetic processing with the very I component and Q component so as to take out a third soft decision bit b3, and output the first, the second and the third soft decision bits b1, b2 and b3, as the restored coded-bit group S35.

In this demodulating circuit 44, when the third soft decision bit b3 is to be taken out, at first, I component and Q component are inputted to absolute value circuits 80 and 81 respectively. The absolute value circuits 80 and 81 find the absolute values S70, S71 of the inputted I component and Q component respectively, and then output these to the subtracter 82. The subtracter 82 subtracts the absolute value S71 of Q component from the absolute value S70 of I component, and outputs the difference value S72 to an arithmetic circuit 83. The arithmetic circuit 83 multiplies the value S72 of the difference between the I component and the Q component by, for instance, $1/\sqrt{2}$, and then outputs the result as the third soft decision bit b3. Thus, in this demodulating circuit 44, the first, the second and the third soft decision bits b1, b2 and b3 can be easily obtained with a simple configuration, by the processing like this.

(6-3) Configuration of Demodulating Circuit corresponding to 16QAM modulation

Figure 22:
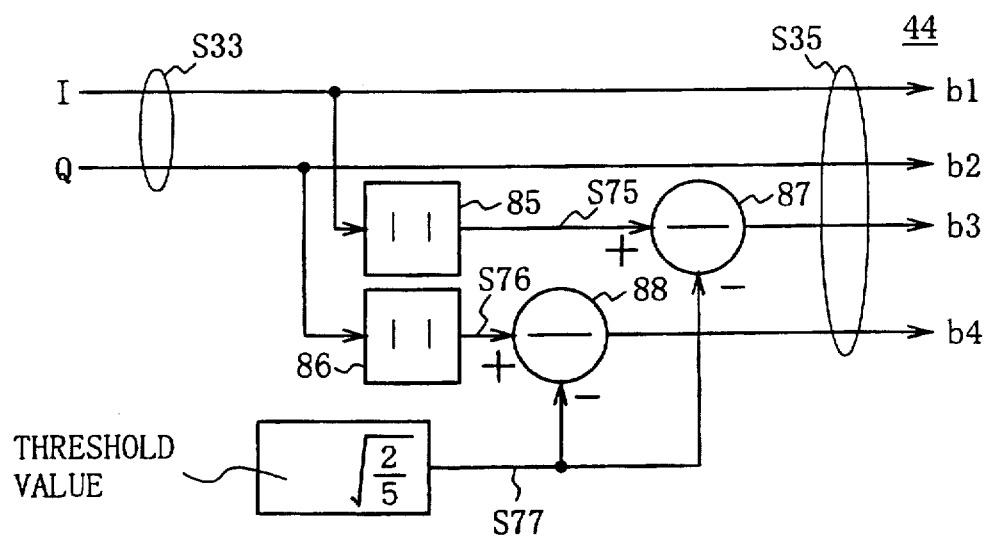
FIG. 22 is a block diagram illustrating a configuration of the demodulating circuit which is corresponding to 16PSK modulation.

In the case where the modulation technique which is employed in the transmitting side is 16QAM modulation, the demodulating circuit 44 is composed as shown in FIG. 22, and the circuit 44 is arranged such that it should take out I component and Q component of each symbol which has been received as the reception information symbol group S33 as they are, as a first and a second soft decision bits b1 and b2 respectively, perform the stated arithmetic processing with the very I component and Q component so as to take out a third and a fourth soft decision bits b3 and b4, and output the first, the second, the third and the fourth soft decision bits b1, b2, b3 and b4, as the restored coded-bit group S35.

In this demodulating circuit 44, when the third and the fourth soft decision bits b3 and b4 are to be taken out, at first, I component and Q component are inputted to absolute value circuits 85 and 86 respectively. The absolute value circuits 85 and 86 find the absolute values S75 and S76 of the inputted I component and Q component respectively, and then output these to the subtracters 87 and 88 respectively. A value "$\sqrt{2/5}$" as an example, has been ever inputted to the subtracter 87 as a decision threshold value S77 of the signal level; the subtracter 87 subtracts the decision threshold S77 from the absolute value S75 of the I component, and outputs the result as the third soft decision bit b3. In like manner, the subtracter 88, to which the decision threshold value S77 of the signal level has been ever inputted, subtracts the decision threshold S77 from the absolute value S76 of the Q component, and outputs the result as the fourth soft decision bit b4.

In this way, this demodulating circuit 44 is adapted to utilize the untouched values of the I component and the Q component as the first and the second soft decision bits b1 and b2, and to obtain the third soft decision bit b3 by subtracting the decision threshold S77 from the absolute value S75 of the I component, and to obtain the fourth soft decision bit b4 by subtracting the decision threshold S77 from the absolute value S76 of the Q component, hereby the demodulating circuit 44 is able to easily obtain the first, the second, the third and the fourth soft decision bits b1–b4, with a simple configuration.

(6-4) Configuration of Demodulating Circuit corresponding to 64QAM modulation

Figure 23:
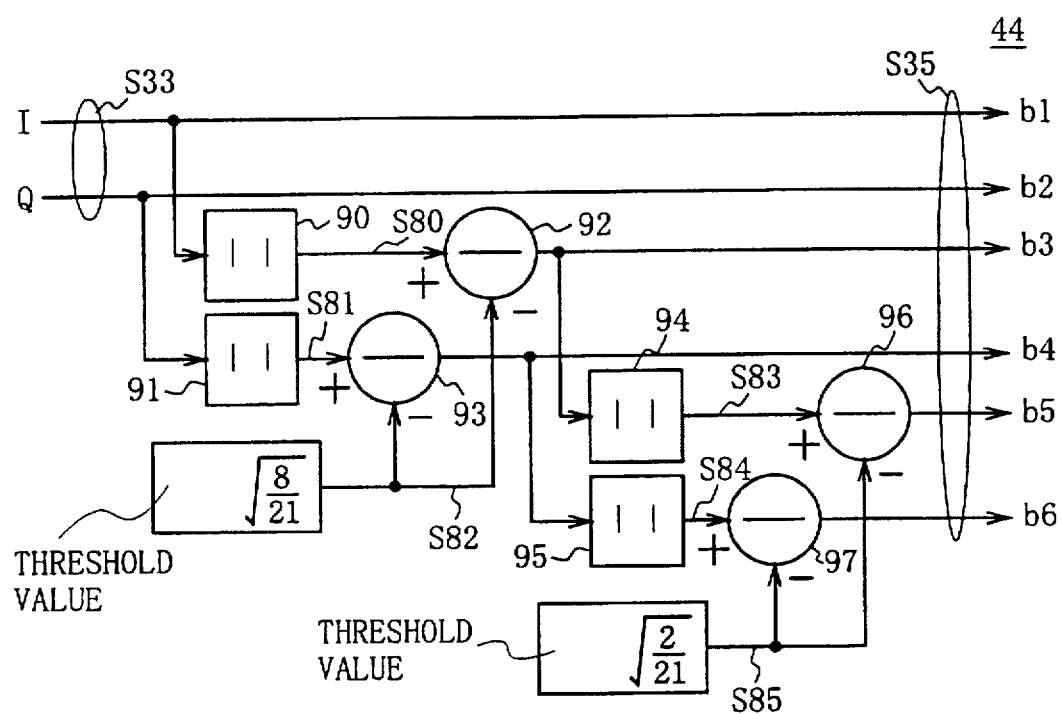
FIG. 23 is a block diagram illustrating a configuration of the demodulating circuit which is corresponding to 64PSK modulation.

In the case where the modulation technique which is employed in the transmitting side is 64QAM modulation, the demodulating circuit 44 is composed as shown in FIG. 23, and the circuit 44 is arranged such that it should take out the untouched I component and Q component of each symbol which has been received as the reception information symbol group S33 as a first and a second soft decision bits b1 and b2 respectively, perform the stated arithmetic processing with the very I component and Q component so as to take out a third, a fourth, a fifth and a sixth soft decision bits b3–b6, and then output the 1st–6th soft decision bits b1–b6 which have been taken out, as the restored coded-bit group S35.

In this demodulating circuit 44, when the 3rd–6th soft decision bits b3–b6 are to be taken out, at first, I component and Q component are inputted to absolute value circuits 90 and 91 respectively. The absolute value circuits 90 and 91 find the absolute values S80 and S81 of the inputted I component and Q component respectively, and then output these to the subtracters 92 and 93 respectively. A value "$\sqrt{8/21}$", as an example, has been ever inputted to the subtracter 92 as the first decision threshold value S82 of the signal level; the subtracter 92 subtracts the first decision threshold S82 from the absolute value S80 of the I component, outputs the result as the third soft decision bit b3, and also outputs the result to an absolute value circuit 94. In like manner, the subtracter 93, to which the first decision threshold value S82 has been ever inputted, subtracts the first decision threshold S82 from the absolute value S81 of the Q component, outputs the result as the fourth soft decision bit b4, and also outputs the result to an absolute value circuit 95.

The absolute value circuits 94 and 95 respectively find absolute values S83 and S84 of the inputted third soft decision bit b3 and the inputted fourth soft decision bit b4, and output them to subtracters 96 and 97 respectively. A value "$\sqrt{2/21}$", as an example, has been ever inputted to the subtracter 96 as the second decision threshold value S85 of the signal level; the subtracter 96 subtracts the second decision threshold value S85 from the absolute value S83 of the third soft decision bit b3, and outputs the result as the fifth soft decision bit b5. In like manner, the subtracter 97, to which the second decision threshold S85 has been ever inputted, subtracts the second decision threshold S85 from the absolute value S84 of the fourth soft decision bit b4, and outputs the result as the sixth soft decision bit b6.

In this way, this demodulating circuit 44 is adapted to utilize the untouched values of the I component and the Q component as the first and the second soft decision bits b1 and b2, and to obtain the third soft decision bit b3 by subtracting the first decision threshold value S82 from the absolute value S80 of the I component, and to obtain the fourth soft decision bit b4 by subtracting the first decision threshold value S82 from the absolute value S81 of the Q component, and to obtain the fifth soft decision bit b5 by subtracting the second decision threshold value S85 from the absolute value S83 of the third soft decision bit b3, and to obtain the sixth soft decision bit b6 by subtracting the second decision threshold value S85 from the absolute value S84 of the fourth soft decision bit b4, hereby the demodulating circuit 44 is able to easily obtain the 1st–6th soft decision bits b1–b6 with a simple configuration.

(7) Configuration of Weighting Circuit

Figure 24:
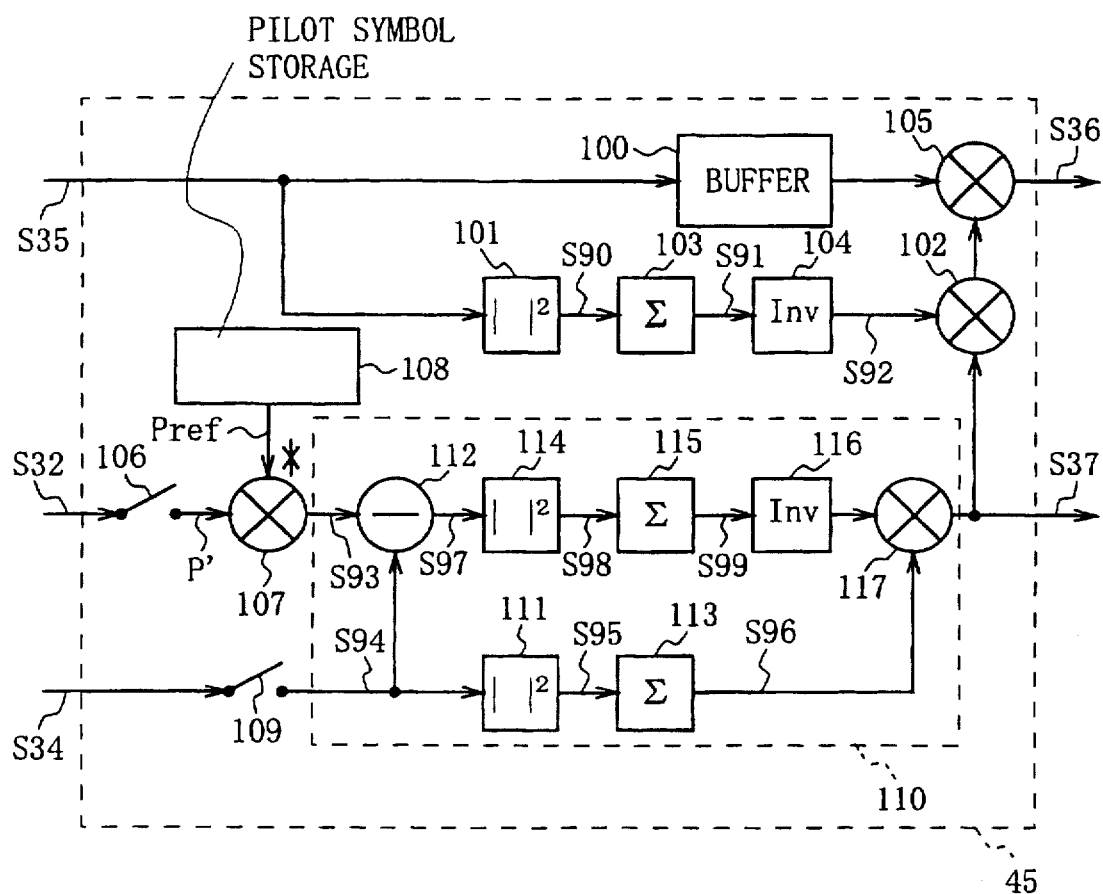
FIG. 24 is a block diagram illustrating a configuration of the weighting circuit.

Next, the above-mentioned weighting circuit 45 is described in this paragraph. As shown in FIG. 24, in the weighting circuit 45, the coded bit group S35 comprising of the soft decision bits which have been taken out by the demodulating circuit 44 is inputted to a buffer 100 and a squaring circuit 101. The buffer 100 is a storage circuit for accumulating the coded bit group S35 of the quantity which corresponds to 1 slot, and it sequentially stores the supplied coded bit group S35 in the internal storage region, so as to accumulate the coded bit group S35 till the quantity which corresponds to 1 slot. When the coded bit group S35 has been accumulated till the quantity which corresponds to 1 slot, the buffer 100 reads and outputs the coded bit group S35 in order, in synchronism with the data-output timing of a multiplier 102 which is described herein below.

On the other hand, the squaring circuit 101 squares the inputted coded bit group S35 in order, so as to calculate an electric-power value S90 of each symbol, and then outputs this to a cumulative addition circuit 103. The cumulative addition circuit 103 accumulates the electric-power values S90 which have been obtained from the coded bit group S35 of the quantity which corresponds to 1 slot, so as to calculate a total value S91 of the electric-power in 1 slot, and then outputs this to a reciprocal value calculating circuit 104. The reciprocal value calculating circuit 104 calculates a reciprocal value S92 of the total value S91 of the electric-power, and outputs this to the multiplier 102. And then, by supplying the reciprocal value S92 of the total value of the electric-power to the multiplier 105 via the multiplier 102, in the multiplier 105, each symbol of the coded bit group S35 is multiplied by the reciprocal value S92 of the total value of the electric-power, so that it is able to make the electric power of the coded bit group S35 uniform for each slot (that is, it is able to normalize the electric power).

On the other hand, the reception symbol group S32 which has been taken out by the fast Fourier transformation circuit 41 is inputted to a signal extracting switch 106. By becoming ON-state at such timing that the reception symbol group S32 is appearing as pilot symbol P', the signal extracting switch 106 extracts the pilot symbols P' from the reception symbol group S32, and then outputs the pilot symbols P' to a multiplier 107.

To the multiplier 107, the reference pilot symbol $P_{ref}$ which has been read from a pilot symbol storage circuit 108 has been ever inputted; the multiplier 107 performs complex multiplication with the pilot symbol P' and the conjugate value of the reference pilot symbol $P_{ref}$, and thereby, finds the quotient which is given by dividing the pilot symbol P' by the reference pilot symbol $P_{ref}$.

In this connection, the reference pilot symbol $P_{ref}$ is the same symbol as the pilot symbol P which has been transmitted at the transmission side, as with the case of the transmission line estimating circuit 43. A symbol sequence S93 which is outputted from the multiplier 107 is ought to become such a sequence that its amplitude value is "1" and its phase value is "0" in theory, as with the case of the transmission line estimating circuit 43; however, in fact, because of influences of noises or interference waves, its amplitude value and phase value are varied. That is, this symbol sequence S93 includes some noise components which have been brought as the influences of noises or interference waves.

While, the reference symbol sequence S34 which has been produced by the transmission line estimating circuit 43 is inputted to a signal extracting switch 109. By becoming ON-state at such timing that the reference symbol sequence S34 is appearing as a symbol which is corresponding to a pilot symbol P', the signal extracting switch 109 extracts only symbols which correspond to the pilot symbols P' from the reference symbol sequence S34, and then outputs them as a symbol sequence S94.

The symbol sequence S94 and the symbol sequence S93 outputted from the multiplier 107 are inputted to a weighting coefficient calculating circuit 110. In the weighting coefficient calculating circuit 110, the symbol sequence S94 is inputted to a squaring circuit 111 along with a subtracter 112, and the symbol sequence S93 is inputted to the subtracter 112. The squaring circuit 111 calculates an electric-power value S95 of each symbol by squaring the amplitude of each symbol of the inputted symbol sequence S94, and then outputs the electric-power value S95 to a cumulative addition circuit 113. The cumulative addition circuit 113 calculates an electric power S96 of the signal of 1 slot by performing cumulative addition of the electric-power values S95 which have been obtained from the symbol sequence S94 of the quantity which corresponds to 1 slot.

On the other hand, in the subtracter 112, a difference value S97 between the amplitude of the symbol sequence S93 and the amplitude of the symbol sequence S94 is calculated. In this connection, the symbol sequence S94 comprises the desirable components, in contrast with, the symbol sequence S93 comprises the desirable signal components and also the undesirable signal components. Therefore, the difference value S97 represents the undesirable components, that is the noise components. The noise components S97 which have been calculated in this manner are inputted to the following squaring circuit 114; whereupon, squaring calculation is performed for each symbol, and hereby an electric-power value S98 of the noise components is calculated for each symbol. The electric-power value S98 of the noise components is inputted to the following cumulative addition circuit 115, and accumulated there, in this way, an electric power S99 of the noise in 1 slot is calculated.

After the reciprocal value of this noise power S99 has been found in a reciprocal calculating circuit 116, the signal power S96 is multiplied by the obtained reciprocal value in a multiplier 117, so that the signal-to-noise power ratio S/N in 1 slot is calculated. This calculated signal-to-noise power ratio S/N is delivered to the above-mentioned control unit 28 as the weighting factor S37 which represents the reliability of the slot, and also delivered to the multiplier 102. In the multiplier 102, the weighting factor S37 is multiplied by the reciprocal value S92, which is given from the above-mentioned reciprocal calculating circuit 104, and the resulted value is inputted to the multiplier 105; whereupon multiplied the resulted value by each of the symbols of the coded bit group S35 outputted from the buffer 100, in order. By this, it is able to uniform the electric power of the coded bit group S35 for each slot as stated above, and also able to cause the signal level of the coded bit group S35 to reflect the reliability of the slot. The coded bit group S36 which has been caused to reflect the reliability of the slot in this manner is supplied to the Viterbi decoding circuit 17, via the above-mentioned slot linking process circuit 15, etc., and decoded in the Viterbi decoding circuit 17.

In this connection, because the above-mentioned weighting factor S37 comprises the signal-to-noise power ratio S/N of a slot, a large value of the weighting factor S37 is representing that the reliability of the very slot is high, that is, its communication quality is good, and a small value of the weighting factor S37 is representing that the reliability of the very slot is low, that is, its communication quality is not good, contrarily.

(8) Management of Frequency Channel based on Weighting Factor

The weighting factor S37 which represents the reliability (that is, the quality of communication) of the slot which has been calculated by the weighting circuit 45 is delivered to the control unit 28, as stated above. As shown in FIG. 5, the control unit 28 is arranged such that it should control the various kinds of operations of the transmitting apparatus 26 and the receiving apparatus 27 which have been mounted on the portable telephone 22, and perform management of the frequency channels which are employed in communication with the base station apparatus 21, on the basis of the weighting factor S37 which is obtained from the weighting circuit 45.

At this point, the management of the frequency channels is concretely described below. The control unit 28 is including a dynamic allocation control circuit which is referred to as a MAC layer controller, and is arranged such that it would perform management of the frequency channels by the use of the dynamic allocation control circuit. This dynamic allocation control circuit monitors the weighting factor S37 which is representing the reliability of each slot, and sums up the values of the weighting factor S37 of the past several slots; in the case where the sum total value is less than the stated threshold value, it decides that the communication state of the frequency channel which is being employed at present should be not good. Whereupon, the dynamic allocation control circuit controls the operation of the transmitting apparatus 26 on the basis of the decision, and transmits the channel alteration request signal for requiring alteration of the frequency channel to the base station apparatus 21, via the transmitting apparatus 26.

On the other hand, the base station apparatus 21 is always monitoring the upward frequency-channels, and grasping which frequency channel is empty, and also grasping which channel is good, with respect to communication state, out of the empty frequency-channels. Additionally, at the time of monitoring of empty channels, the base station apparatus 21 measures the electric power of each channel of the upward frequency channels; if the electric power is more than the stated threshold value, it decides that the other communication should be utilizing the very channel in the neighborhood, and, if the power is less than the threshold value, it decides that the channel should be empty. As used herein, upward refers to the direction from a portable telephone 22 to a base station apparatus 21, and downward refers to the direction from a base station apparatus 21 to a portable telephone 22 contrarily.

When the base station apparatus 21 has received the channel alteration request signal from the portable telephone 22, the base station apparatus 21 selects one channel whose communication state is satisfactory out of the grasping upward empty channels, and transmits a channel information signal which indicates the very upward frequency channel toward the portable telephone 22, via the transmitting apparatus 23. After transmission of the channel information signal, the base station apparatus 21 alters the reception channel of the receiving apparatus 24 into the upward frequency channel which is indicated by the channel information signal, and also alters the transmission channel of the transmitting apparatus 23 into the downward frequency channel which is paired with the very upward frequency channel.

On the other hand, the portable telephone 22 which has received the channel information signal alters the transmission channel of the transmitting apparatus 26 into the upward frequency channel which is indicated by the very channel information signal, and also alters the reception channel of the receiving apparatus 27 into the downward frequency channel which is paired with the very upward frequency channel. By performing such a series of channel alteration processing, it is capable of switching rapidly from a frequency channel whose communication state is bad to a frequency channel whose communication state is good.

In this connection, the configurations of the base station apparatus 21 and the portable telephone 22 are basically identical; the control unit 25 of the base station apparatus 21 also monitors whether the upward frequency channel is satisfactory or not on the basis of the weighting factor which is sent from the receiving apparatus 24, and, if the communication state has become unsatisfactory, it suitably selects a frequency channel out of the grasping empty channels, transmits the channel information signal which indicates the very frequency channel to the portable telephone 22, and then alters the upward and downward frequency channels, as with the control unit 28 of the portable telephone 22.

Besides, the management of the frequency channels described above can be performed in such time that so-called frequency hopping is performed wherein the frequency is altered at random, or that the frequency channel is fixed.

(9) Operation and Effects

In the case of the radio communication system 20 having the above configuration, at first, the pilot symbols P are inserted in spaces between the information symbols I at the transmitting side, hereby the transmission symbol group S20 is produced, and the symbols of the transmission symbol group S20 are superimposed on 24 sub-carriers, one for each, and then transmitted. On the other hand, at the receiving side, the reception symbol group S32 which has been obtained through the stated reception processing is inputted to the transmission line estimating circuit 43, and the received pilot symbols P' are extracted, at here, from the reception symbol group S32. Then, by performing the stated arithmetic process based on the amplitude and the phase information of the pilot symbols P', a reference symbol sequence S34 showing the amplitude variation and the phase rotation which are included in the reception symbol group S32 is produced. In this manner, by multiplying the respective symbols of the reception symbol group S32 by the reciprocal values of this reference symbol sequence S34, it is able to eliminate the amplitude variation and the phase rotation which have been included in the reception symbol group S32, and to correctly restore the transmitted information symbol I.

In this connection, as the pilot symbols P are inserted in the spaces between the information symbols I at the transmitting side, the receiving side is able to estimate the influences of fading, etc. which have been brought about during the transmitting process over the whole slots, and hereby able to produce the reference symbol sequence S34, more accurately. Besides, in this case, owing to the fact that each of the symbols of the transmission symbol group S20 is distributed to 24 sub-carriers and superimposed thereon, and then these are transmitted (that is, because each of the symbols of the transmission symbol group S20 is arranged on the axis of frequency and then transmitted), the receiving side is able to eliminate the amplitude variation and the phase rotation, by only the process of multiplying the respective symbols of the reception symbol group S32 by the calculated reference symbol sequence S34, and able to perform equalizing process without employing a complicated equalizer for performing convolutional multiplication in the temporal region as before, therefore, the configuration of the receiving apparatus 27 can be simplified, proportionately.

The information symbols I which have been restored in this manner are inputted to the succeeding demodulating circuit 44. The demodulating circuit 44 restores the transmitted coded bit sequence S39, and then outputs this to the succeeding weighting circuit 45. In the weighting circuit 45, the signal electric-power of the slot is calculated on the basis of the amplitude of the reference symbol sequence S34 which has been produced by the transmission line estimating circuit 43, and the electric power of the noise components is calculated on the basis of the difference between the amplitude of the reference symbol sequence S34 and the amplitude of the reception symbol S32, and then the signal-to-noise power ratio S/N which shows the communication quality, that is, the reliability of the slot is calculated on the basis of these signal power and noise power. And, in the weighting circuit 45, the signal-to-noise power ratio S/N is set as the weighting factor S37, and the coded bit group S34 is multiplied by the weighting factor S37, and hereby the signal level of the coded bit group S34 is caused to reflect the reliability of the slot.

The coded bit group S36 which is reflecting the reliability of the slot is exposed to the stated processing through the slot linking process circuit 15 and the de-interleave buffer 16, and then inputted to the Viterbi decoding circuit 17 as the coded bit sequence S39. In the Viterbi decoding circuit 17, maximum likelihood sequence estimation is applied to the coded bit sequence S39, so that the transmitted information bit sequence S40 is restored. In this case, owing to the fact that the signal level of the coded bit group S39 has been caused to reflect the reliability of the slot, it is able to applied maximum likelihood sequence estimation, introducing the reliability of the slot, and so it is able to apply maximum likelihood sequence estimation more precisely, and to restore the information bit sequence S40 further precisely, in the Viterbi decoding circuit 17.

By the way, the weighting factor S37 representing the reliability of the slot which has been calculated in the weighting circuit 45 is delivered to also the control unit 28. The control unit 28 monitors the weighting factor S37, so as to judge the communication state of the frequency channel; if the communication state of the frequency channel is bad, then it transmits a channel alteration request signal to the base station apparatus 21. The base station apparatus 21 is previously grasping some frequency channels which are empty and communication states of which are good; in response to the channel alteration request signal, it selects a new channel out of the grasping frequency-channels, alters the transmission channel to this frequency channel, and notifies this to the portable telephone 22. The control unit 28 of the portable telephone 22 which has received this notification alters the receiving channel to the notified frequency channel. Owing to the fact that the state of the transmission line is judged on the basis of the weighting factor S37 which is representing the reliability of the slot, in the case where the state of the transmission line is bad, it is able to quickly switch into a transmission line whose state is good.

Besides, in the case of this radio communication system 20, it is adapted to perform so-called frequency hopping, that is, to alter the employed frequency channel for each slot at random at the time of transmission. In addition to this, owing to the fact that interleaving is performed over plural slots, even though a slot which has been affected by some interference waves occurred, it is able to make the electric power of the interference waves even, and to reduce the influence of the interference waves.

In this connection, since the electric power of interference waves is treated as noise components at the weighting circuit 45, the weighting factor S37 is diminished in the case where there are some interference waves, as a result, the signal level of the coded bit which is being affected by the interference waves is also diminished. Accordingly, even though the electric power of the desirable wave has become small compared to the electric power of the undesirable wave owing to the influences of the interference waves, the electric power of the undesirable wave is diminished by weighting processing of the weighting circuit 45, so that maximum likelihood sequence estimation can be applied with high precision.

According to the above configuration, the pilot symbols should be extracted from reception symbols, the reference symbols which represent the characteristics of the transmission line should be produced on the basis of the amplitude and the phase of the pilot symbols, the reception symbols should be multiplied by the reciprocal values of the reference symbols, the weighting factors which represent the reliability of the respective slots should be calculated on the basis of the reference symbols, and the coded bits which have been demodulated from the reception symbols should be multiplied by the weighting factors. In result, it is capable of eliminating the influences which have been exerted at the transmission line from the reception symbol with a simple configuration, causing the coded bits to reflect the reliability of the slots, and applying maximum likelihood sequence estimation with high precision, so that the transmitted information bits can be restored with high precision.

(10) Other Aspects of Implementation

In the above aspects of implementation, the description has been given of the case where the pilot symbols P have been inserted to the spaces between the information symbols I, so that they have regular intervals; however, we do not intend to limit the present invention to such a case. The pilot symbols P may be inserted at random with respect to the intervals. In brief, so long as the pilot symbols P are adequately distributed among the information symbols I and inserted, the same effects as the above can be also obtained.

Besides, in the above aspects of implementation, the description has been given of the case where so-called frequency hopping is performed wherein the frequency channel is altered at random, on the basis of the known pattern; however, we do not intend to limit the present invention to such a case. In the case where the environment is such that influences of any interference wave do not occur, the frequency channel may be fixed.

Besides, in the above aspects of implementation, the description has been given of the case where the reference symbol sequence S34 which follows the linear phase-rotation and the linear amplitude-variation is produced in the transmission line estimating circuit 43; however, we do not intend to limit the present invention to such a case. When communication is performed in such an environment that frequency selective fading do not occur, like the interior of a room, etc., the mean value of the reception symbol constellation which has been calculated in the following way may be uniquely determined as the amplitude of the reference symbol sequence. In this case, the mean value of the reception symbol constellation can be easily found by cumulatively adding I components and Q components of the signal which has been outputted from the multiplier 51 respectively, and dividing the added result by the number of the symbols.

Besides, in the above aspects of implementation, the description has been given of the case where normalization of the electric power has been performed in the weighting circuit 45, by multiplying the coded bit sequence S35 by the reciprocal value S92 which has been obtained via the squaring circuit 101, the cumulative addition circuit 103, and the reciprocal number calculating circuit 104; however, we do not intend to limit the present invention to such a case. This normalization process may be not performed.

Besides, in the above aspects of implementation, the description has been given of the case where the signal-to-noise power ratio S/N has been found in the weighting circuit 45, on the basis of the sum total of the electric power of the noise of 1 slot and the sum total of the electric power of the signal of 1 slot; however, we do not intend to limit the present invention to such a case. The same effects as the above can be obtained also by finding the signal-to-noise power ratio S/N on the basis of the mean value of the electric power of the noise and the mean value of the electric power of the signal in 1 slot.

Besides, in the above aspects of implementation, the description has been given of the case where the control unit 28 has performed the management of the frequency channels on the basis of the weighting factor S37 which has been obtained by the weighting circuit 45; however, we do not intend to limit the present invention to such a case. The electric power of transmission may be controlled, on the basis of the weighting factor which represents the reliability of the slot.

Besides, in the above aspects of implementation, the description has been given of the case where the linear coefficient $\phi\theta$ of the phase function $\theta n$ has been found and then the reference symbol sequence S34 has been found; however, we do not intend to limit the present invention to such a case. Window-spanning process of the fast Fourier transformation circuit 41 may be controlled, on the basis of the very linear coefficient $\phi\theta$.

Besides, in the above aspects of implementation, the description has been given of the case where the convolutional coding circuit 2 has been employed as the coding circuit, and the Viterbi decoding circuit 17 has been employed as the decoding circuit; however, we do not intend to limit the present invention to such a case. A coding circuit for carrying out the other coding mode such as turbo-code and a decoding circuit may be applied. In brief, by using such a coding/decoding method that a coding mode which enlarges the distance between the sequences is employed in the transmitting side, and the coded bit sequence is decoded by maximum likelihood sequence estimation in the receiving side, the same effects as the above can be obtained.

Besides, in the above aspects of implementation, the description has been given of the case where the present invention has been applied to the radio communication system 20, such as the portable telephone system; however, the present invention is applicable not merely to this case, but also to other radio communication systems, such as a cordless telephone system.

Besides, in the above aspects of implementation, the description has been given of the case where the receiving apparatus 27 has been provided with the receiving means which comprises the receiving circuit 40 and the fast Fourier transformation circuit 41, and the apparatus 27 has been further provided with the transmission line estimating circuit 43 for estimating the characteristics of the transmission line on the basis of the reception symbol group S32, the demodulating circuit 44 for restoring the coded bit group S35 from the reception information symbol group S33 which has been restored by the transmission line estimating circuit 43, the weighting circuit 45 for causing the coded bit group S35 to reflect the reliability of the slots, and the Viterbi decoding circuit 17 for restoring the transmitted information bit sequence S40 from the coded bit sequence S39; however, we do not intend to limit the present invention to such a case. The same effects as that of the above-mentioned case can be obtained, by equipping the receiving apparatus with:

receiving means for receiving a transmission signal and for outputting a reception symbol group, said transmission signal has been produced in such a manner that a coded bit sequence, which is formed by coding of an information bit sequence, is partitioned for each stated information unit to produce a coded bit group, the coded bit group is subjected to the stated modulation processing to produce an information symbol group, then, pilot symbols whose amplitude and phases are known are inserted in the information symbol group to produce a transmission symbol group, and then, each of the symbols of the transmission symbol group is distributed and superimposed to the plural sub-carriers which form the frequency channel;

transmission line estimating means for extracting the pilot symbols respectively from the reception symbol group, for estimating the characteristics of the transmission line of each symbol group on the basis of the amplitude and the phases of the pilot symbols, and for restoring the information symbol group respectively from the reception symbol group on the basis of the result of the estimation;

demodulating means for performing the stated demodulation processing with the information symbol group and for restoring the coded bit group thereby;

weighting means for calculating the reliability of the transmission line of each symbol group on the basis of the result of the estimation of the transmission line estimating means and the reception symbol group, for multiplying the coded bit group by the weighting factor which indicates the reliability of the transmission line, and for causing the coded bit group to reflect the reliability of the transmission line thereby; and decoding means for applying maximum likelihood sequence estimation respectively to the coded bit group which has been obtained by the weighting means, and for restoring the information bit sequence thereby.

Besides, in the above aspects of implementation, the description has been given of the case where the base station apparatus 21 and/or the portable telephone 22 has been equipped with the transmitting apparatus which comprises the convolutional coding circuit 2, the slotting process circuit 4, the modulating circuit 5, the pilot symbol adding circuit 31, the inverse fast Fourier transformation circuit 32, and the transmitting circuit 33, and further equipped with the receiving apparatus which comprises the receiving circuit 40, the fast Fourier transformation circuit 41, the transmission line estimating circuit 43, the demodulating circuit 44, the weighting circuit 45, and the Viterbi decoding circuit 17; however, we do not intend to limit the present invention to such a case. The same effects as that of the above-mentioned case can be obtained, by equipping the base station apparatus 21 and/or the portable telephone 22 with:

transmitting means for partitioning a coded bit sequence, which is formed by coding of an information bit sequence, for each stated information unit to produce a coded bit group, for performing the stated modulation processing with the coded bit group respectively to produce an information symbol group, for inserting pilot symbols whose amplitude and phases are known in the information symbol group to produce a transmission symbol group, for distributing and superimposing each of the symbols of the transmission symbol group to the plural sub-carriers which form the frequency channel to produce a transmission signal, and for transmitting the transmission signal to the partner of the communication;

receiving means for receiving the stated frequency channel, for receiving thereby the transmission signal sent from the partner of the communication, and for outputting the reception symbol group;

transmission line estimating means for extracting the respective pilot symbols from the reception symbol group, for estimating the characteristics of the transmission line of each symbol group on the basis of the amplitude and the phases of the pilot symbols, and for restoring the information symbol group respectively from the reception symbol group on the basis of the result of the estimation;

demodulating means for performing the stated demodulation processing respectively with the information symbol group which has been obtained by the transmission line estimating means, and for restoring the coded bit group thereby;

weighting means for calculating the reliability of the transmission line of each symbol group on the basis of the result of the estimation of the transmission line estimating means and the reception symbol group, for multiplying the coded bit group by the weighting factor which indicates the reliability of the transmission line, and for causing the coded bit group to reflect the reliability of the transmission line thereby; and decoding means for applying maximum likelihood sequence estimation respectively to the coded bit group which has been obtained by the weighting means, and for restoring the information bit sequence thereby.

Besides, in the above aspects of implementation, the description has been given of the case where, at the transmission side, the pilot symbols P have been inserted in the spaces between the information symbols I, and the transmission symbol group S20 has been transmitted employing the plural sub-carriers, while, at the receiving side, the pilot symbols P' have been extracted from the reception symbol group S32, and the characteristics of the transmission line have been estimated on the basis of the pilot symbols P', and the reliability of the slot has been calculated on the basis of the estimated result S34 of the estimation of the transmission line and the reception symbol group S32; however, we do not intend to limit the present invention to such a case. The same effects as that of the above-mentioned case can be obtained, by the steps of:

partitioning a coded bit sequence, which is formed by coding of an information bit sequence, for each stated information unit, to produce a coded bit group;

performing the stated modulation processing with the coded bit group respectively, to produce an information symbol group;

inserting pilot symbols whose amplitude and phases are known in the information symbol group, to produce a transmission symbol group;

distributing and superimposing each of the symbols of the transmission symbol group to the plural sub-carriers which form the frequency channel, to produce a transmission signal;

transmitting the transmission signal to the partner of the communication; and, at the reception side, receiving the frequency channel, so as to receive the transmission signal sent from the partner of the communication, and to obtain a reception symbol group thereby;

extracting the pilot symbols from the reception symbol group;

estimating the characteristics of the transmission line of each symbol group, on the basis of the amplitude and the phases of the pilot symbols;

restoring the information symbol group respectively from the reception symbol group, on the basis of the result of the estimation;

performing the stated demodulation processing respectively with the information symbol group, so as to restore the coded bit group;

calculating the reliability of the transmission line of each symbol group, on the basis of the result of the estimation of the transmission line and the reception symbol group;

multiplying the restored coded bit group by the weighting factor which represents the reliability of the transmission line, so as to cause the coded bit group to reflect the reliability of the transmission line thereby;

applying maximum likelihood sequence estimation respectively with the coded bit group which is reflecting the reliability; and restoring thereby the information bit sequence.

As described above, according to the present invention, the characteristics of the transmission line of each symbol group are estimated on the basis of the amplitude and the phases of the pilot symbols which have been extracted from the reception symbol group, and the information symbol group is restored from the reception symbol group on the basis of the result of the estimation, and the coded bit group which has been restored from the information symbol group is multiplied by the weighting factor and caused to reflect the reliability of the transmission line of each symbol group, and maximum likelihood sequence estimation is applied to the coded bit group which is reflecting the reliability, and thereby the information bit sequence is restored; as a result, by the use of simple configuration, influences given through the transmission line can be eliminated and so the information symbol group can be restored exactly, besides, the reliability of the transmission line of each symbol group can be reflected on the coded bit group, in this way, maximum likelihood sequence estimation can be applied precisely and the transmitted information bit sequence can be restored exactly.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A receiving apparatus, comprising:

receiving means for receiving a transmission signal and for outputting reception symbol groups, wherein the transmission signal has been produced by partitioning a coded bit sequence which is formed by coding an information bit sequence for each prescribed information unit so as to produce coded bit groups, applying prescribed modulation processing to each of said coded bit groups to produce information symbol groups, inserting pilot symbols of known amplitude and phases into each of said information symbol groups to produce transmission symbol groups, and dispersedly superimposing respective symbols of said transmission symbol groups on a plurality of sub-carriers which form a frequency channel;

transmission line estimating means for extracting said pilot symbols from each of said reception symbol groups, estimating the characteristics of the transmission line of each symbol group based on the amplitude and the phases of the pilot symbols, and restoring said information symbol groups respectively from said reception symbol groups based on said estimation;

demodulating means for applying prescribed demodulation processing to each of said information symbol groups obtained by said transmission line estimating means to restore said coded bit groups;

weighting means for reflecting a reliability of said transmission line on said coded bit groups by calculating the reliability of the transmission line of each symbol group based on the estimation of said transmission line estimating means and said reception symbol group and multiplying said coded bit groups obtained via said demodulating means by weighting factors which indicate the reliability of the transmission line; and decoding means for applying maximum likelihood sequence estimation to each of said coded bit groups obtained by said weighting means which reflect the reliability of said transmission line to restore said information bit sequence.

2. The receiving apparatus as set forth in claim 1, wherein in the case where said frequency channel employed for each of said transmission symbol groups is altered at a transmitting side, said receiving means alters the frequency channel for reception so as to tune to the transmitting side.

3. The receiving apparatus as set forth in claim 1, further comprising:

transmitting means; and controlling means for monitoring a weighting factor of the weighting factors calculated by said weighting means and controlling said transmitting means to transmit a channel alteration request signal which requires an alteration of the frequency channel to a transmitting side where said weighting factor has fallen below a prescribed threshold value.

4. The receiving apparatus as set forth in claim 1, wherein when said modulation processing employed at the transmitting side is 8 phase shift keying, said demodulating means takes out an I component having an absolute value and a Q component having an absolute value of said information symbol group as first and second soft decision bits, respectively, subtracts the absolute value of said Q component from the absolute value of said I component to produce a resulting difference value, multiplies the resulting difference value by a prescribed number so as to obtain a third soft decision bit, and outputs said obtained first, second and third soft decision bits as said coded bit group.

5. The receiving apparatus as set forth in claim 1, wherein when said modulation processing employed at the transmitting side is 16-valued quadrature amplitude modulation, said demodulating means takes out an I component having an absolute value and a Q component having an absolute value of said information symbol group as first and second soft decision bits, respectively, subtracts a prescribed decision threshold value from the absolute values of said I and Q components so as to obtain third and fourth soft decision bits, respectively, and outputs said obtained first, second, third and fourth soft decision bits as said coded bit group.

6. The receiving apparatus as set forth in claim 1, wherein when said modulation processing employed at the transmitting side is 64-valued quadrature amplitude modulation, said demodulating means takes out an I component having an absolute value and a Q component having an absolute value of said information symbol group as first and second soft decision bits, respectively, subtracts a first decision threshold value from the absolute values of said I and Q components so as to obtain a third soft decision bit having an absolute value and a fourth soft decision bit having an absolute value, respectively, and subtracts a second decision threshold value from the absolute values of said third and fourth soft decision bits so as to obtain fifth and sixth soft decision bits, respectively, and outputs said obtained first, second, third, fourth, fifth and sixth soft decision bits as said coded bit group.

7. A transmitting/receiving apparatus, comprising: transmitting means for partitioning a coded bit sequence which is formed by coding an information bit sequence for each prescribed information unit to produce coded bit groups, applying prescribed modulation processing to each of said coded bit groups to produce information symbol groups, inserting pilot symbols of known amplitude and phases into each of said information symbol groups to produce transmission symbol groups, dispersedly superimposing respective symbols of the transmission symbol groups on a plurality of subcarriers which form a frequency channel to produce a transmission signal, and transmitting said transmission signal to a partner of the communication;

receiving means for receiving a prescribed channel so as to receive said transmission signal sent from the partner of the communication and outputting reception symbol groups; transmission line estimating means for extracting said pilot symbols from each of said reception symbol groups, estimating characteristics of the transmission line of each symbol group based on amplitude and phases of the pilot symbols, and restoring said information symbol groups respectively from said reception symbol groups based on said estimation;

demodulating means for applying prescribed demodulation processing to each of said information symbol groups obtained by said transmission line estimating means to restore said coded bit groups;

weighting means for reflecting a reliability of said transmission line on said coded bit groups by calculating the reliability of the transmission line of each symbol group based on the estimation of said transmission line estimating means and said reception symbol group and multiplying said coded bit groups obtained via said demodulating means by weighting factors which indicate the reliability of the transmission line; and decoding means for applying maximum likelihood sequence estimation to each of said coded bit groups obtained by said weighting means, which are reflecting the reliability of said transmission line, to restore said information bit sequence.

8. The transmitting/receiving apparatus as set forth in claim 7, wherein said transmitting means alters said frequency channel employed for each of said transmission symbol groups.

9. The transmitting/receiving apparatus as set forth in claim 8, wherein when said transmitting means of the partner of the communication alters said frequency channel employed for each of said transmission symbol groups, said receiving means alters the frequency channel for reception so as to tune to said transmitting means of the partner of the communication.

10. The transmitting/receiving apparatus as set forth in claim 7, comprising controlling means for monitoring a weighting factor of the weighting factors calculated by said weighting means and controlling said transmitting means to transmit a channel alteration request signal which requires an alteration of the frequency channel to the partner of the communication, in the case where said weighting factor has fallen below a prescribed threshold value.

11. The transmitting/receiving apparatus as set forth in claim 7, wherein when said modulation processing employed at said transmitting means of the partner of the communication is 8 phase shift keying, said demodulating means takes out an I component having an absolute value and a Q component having an absolute value of said information symbol group as first and second soft decision bits, respectively, subtracts the absolute value of said Q component from the absolute value of said I component to produce a resulting difference value, multiplies the resulting difference value by a prescribed number so as to obtain a third soft decision bit, and outputs said obtained first, second and third soft decision bits as said coded bit group.

12. The transmitting/receiving apparatus as set forth in claim 7, wherein when said modulation processing employed at said transmitting means of the partner of the communication is 16-valued quadrature amplitude modulation, said demodulating means takes out an I component having an absolute value and a Q component having an absolute value of said information symbol group as first and second soft decision bits, respectively, subtracts a prescribed decision threshold value from the absolute values of said I and Q components so as to obtain third and fourth soft decision bits, respectively, and outputs said obtained first, second, third and fourth soft decision bits as said coded bit group.

13. The transmitting/receiving apparatus as set forth in claim 7, wherein when said modulation processing employed at said transmitting means of the partner of the communication is 64-valued quadrature amplitude modulation, said demodulating means takes out an I component having an absolute value and a Q component having an absolute value of said information symbol group as first and second soft decision bits, respectively, subtracts a first decision threshold value from the absolute values of said I and Q components so as to obtain third and fourth soft decision bits, respectively, subtracts a second decision threshold value from the absolute values of said third and fourth soft decision bits so as to obtain fifth and sixth soft decision bits, respectively, and outputs said obtained first, second, third, fourth, fifth and sixth soft decision bits as said coded bit group.

14. A communicating method comprising the steps of:

partitioning a coded bit sequence which is formed by coding an information bit sequence for each prescribed information unit to produce coded bit groups, applying prescribed modulation processing to each of said coded bit groups to produce information symbol groups, inserting pilot symbols of known amplitude and phases into each of said information symbol groups to produce transmission symbol groups, dispersedly superimposing respective symbols of said transmission symbol groups to a plurality of sub-carriers which form a frequency channel to produce a transmission signal, and transmitting said transmission signal to a partner of the communication; and on a reception side, receiving said frequency channel so as to receive said transmission signal sent from the partner of the communication to obtain reception symbol groups, extracting said pilot symbols from said reception symbol groups, estimating characteristics of the transmission line of each symbol group based on the amplitude and the phases of said pilot symbols, restoring said information symbol groups respectively from said reception symbol groups based on said estimation, applying prescribed demodulation processing to said information symbol groups so as to restore said coded bit groups, calculating a reliability of the transmission line of each symbol group based on the estimation of said transmission line and said reception symbol group, multiplying said restored coded bit groups by weighting factors which indicate the reliability of the transmission line so as to reflect the reliability of said transmission line on said coded bit groups, and applying maximum likelihood sequence estimation to each of said coded bit groups which are reflecting the reliability so as to restore said information bit sequence.

15. The communicating method as set forth in claim 14, wherein at the time of transmission, said frequency channel which is employed is altered for each of said transmission symbol groups.

16. The communicating method as set forth in claim 15, wherein on a reception side, said frequency channel to be received is altered so as to tune to a transmission side.

17. The communicating method as set forth in claim 14, wherein:

a reception side monitors a weighting factor of said weighting factors and transmits a channel alteration request signal of which requires an alteration of said frequency channel to a transmission side when said weighting factor has fallen below a prescribed threshold value; and a transmission side alters said frequency channel which is employed in response to said channel alteration request signal.

* * * * *